United States Patent
He et al.

(10) Patent No.: US 8,958,379 B2
(45) Date of Patent: Feb. 17, 2015

(54) PHYSICAL UPLINK CONTROL CHANNEL (PUCCH) RESOURCE MAPPING USING AN ENHANCED PHYSICAL DOWNLINK CONTROL CHANNEL (EPDCCH)

(75) Inventors: Hong He, Beijing (CN); Jong-Kae Fwu, Sunnyvale, CA (US); Yuan Zhu, Beijing (CN)

(73) Assignee: Intel Corporation, Santa Clara, CA (US)

( * ) Notice: Subject to any disclaimer, the term of this patent is extended or adjusted under 35 U.S.C. 154(b) by 7 days.

(21) Appl. No.: 13/620,108

(22) Filed: Sep. 14, 2012

(65) Prior Publication Data

US 2013/0242890 A1    Sep. 19, 2013

Related U.S. Application Data

(60) Provisional application No. 61/612,188, filed on Mar. 16, 2012.

(51) Int. Cl.
*H04W 72/04* (2009.01)
*H04N 21/258* (2011.01)
(Continued)

(52) U.S. Cl.
CPC ..... *H04N 21/25841* (2013.01); *H04W 72/0406* (2013.01); *H04W 72/082* (2013.01); *H04W 52/02* (2013.01); *H04L 5/14* (2013.01); *H04W 72/1205* (2013.01); *H04W 76/048* (2013.01); *H04W 72/04* (2013.01); *H04W 72/0413* (2013.01); *H04W 72/042* (2013.01); *H04W 52/0235* (2013.01); *H04W 24/00* (2013.01);
(Continued)

(58) Field of Classification Search
None
See application file for complete search history.

(56) References Cited

U.S. PATENT DOCUMENTS 8,059,735 B2 * 11/2011 Shen et al. ............. 375/260
8,453,124 B2 * 5/2013 Alexander et al. ...... 717/130
(Continued)

FOREIGN PATENT DOCUMENTS

WO     2013/138773 A1     9/2013

OTHER PUBLICATIONS

Alcatel-Lucent, "PUCCH resource mapping with ePDCCH", R1-114066, 3GPP TSG RAN WG1 Meeting #67, San Francisco, USA, Nov. 14-18, 2011, 2 pages.
(Continued)

*Primary Examiner* — Chandal Elpenord
(74) *Attorney, Agent, or Firm* — Thorpe North & Western LLP

(57) ABSTRACT

Technology for physical uplink control channel (PUCCH) resource mapping corresponding to an enhanced physical downlink control channel (ePDCCH) is disclosed. One method can include a node mapping a PUCCH resource $n_{PUCCH}^{(1)}$ corresponding to an ePDCCH for PUCCH resource hybrid automatic repeat request-acknowledgement (HARQ-ACK) feedback. The PUCCH resource $n_{PUCCH}^{(1)}$ can be determined using a lowest PRB index including at least one enhanced control channel element (eCCE) of ePDCCH resources and a total number of eCCE in one physical resource block (PRB).

20 Claims, 15 Drawing Sheets

(51) Int. Cl.
*H04W 72/08* (2009.01)
*H04W 52/02* (2009.01)
*H04L 5/14* (2006.01)
*H04W 72/12* (2009.01)
*H04W 76/04* (2009.01)
*H04W 24/00* (2009.01)
*H04W 24/02* (2009.01)
*H04N 21/414* (2011.01)
*H04N 21/6405* (2011.01)
*H04N 21/6408* (2011.01)
*H04W 4/06* (2009.01)
*H04W 52/14* (2009.01)

(52) U.S. Cl.
CPC ..... *H04W 52/0206* (2013.01); *H04W 52/0209* (2013.01); *H04W 24/02* (2013.01); *H04N 21/41407* (2013.01); *H04N 21/6405* (2013.01); *H04N 21/6408* (2013.01); *H04W 4/06* (2013.01); *H04W 52/0229* (2013.01); *Y02B 60/50* (2013.01); *H04W 52/143* (2013.01); *H04W 72/0446* (2013.01)
USPC ........... 370/329; 370/341; 370/344; 370/281; 370/252; 455/452.2; 455/509

(56) References Cited

U.S. PATENT DOCUMENTS

| | | | |
|---|---|---|---|
| 8,543,124 B2* | 9/2013 | Papasakellariou et al. | 455/450 |
| 2010/0232273 A1* | 9/2010 | Watanabe | 369/53.2 |
| 2011/0228731 A1* | 9/2011 | Luo et al. | 370/329 |
| 2011/0268062 A1* | 11/2011 | Ji et al. | 370/329 |
| 2011/0310789 A1 | 12/2011 | Hu et al. | |
| 2012/0320848 A1* | 12/2012 | Chen et al. | 370/329 |
| 2013/0039284 A1* | 2/2013 | Marinier et al. | 370/329 |
| 2013/0215842 A1* | 8/2013 | Han et al. | 370/329 |
| 2013/0230017 A1* | 9/2013 | Papasakellariou et al. | 370/330 |

OTHER PUBLICATIONS

Asustek, "PUCCH Resource Allocation Corresponding to ePDCCH", R1-120666, 3GPP TSG RAN WG1 Meeting #68, Dresden, Germany, Feb. 6-10, 2012, 2 pages.

Pantech, "PUCCH resource allocation for E-PDCCH", R1-120329, 3GPP TSG RAN1 #68, Dresden, Germany, Feb. 6-10, 2012, 2 pages.

International Search Report and Written Opinion received for PCT Patent Application No. PCT/US2013/032453, mailed on Jun. 28, 2013, 11 pages.

Samsung, "HARQ-ACK Transmission in Response to E-PDCCH Detection", R1-120193, 3GPP TSG RAN WG1 #68, Dresden, Germany, Feb. 6-10, 2012, 3 pages.

* cited by examiner

500

510 — Mapping a PUCCH resource corresponding to an ePDCCH for PUCCH resource hybrid automatic repeat request-acknowledgement (HARQ-ACK) feedback, wherein the PUCCH resource is determined using a lowest PRB index including at least one enhanced control channel element (eCCE) of ePDCCH resources and a total number of eCCE in one physical resource block (PRB).

FIG. 12

PHYSICAL UPLINK CONTROL CHANNEL (PUCCH) RESOURCE MAPPING USING AN ENHANCED PHYSICAL DOWNLINK CONTROL CHANNEL (EPDCCH)

RELATED APPLICATIONS

This application claims the benefit of and hereby incorporates by reference U.S. Provisional Patent Application Ser. No. 61/612,188, filed Mar. 16, 2012.

BACKGROUND

Wireless mobile communication technology uses various standards and protocols to transmit data between a node (e.g., a transmission station or a transceiver node) and a wireless device (e.g., a mobile device). Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems, the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the wireless device, known as a user equipment (UE). The downlink (DL) transmission can be a communication from the node (e.g., eNodeB) to the wireless device (e.g., UE), and the uplink (UL) transmission can be a communication from the wireless device to the node.

In LTE, data can be transmitted from the eNodeB to the UE via a physical downlink shared channel (PDSCH). A physical downlink control channel (PDCCH) can be used to transfer downlink control information (DCI) that informs the UE about resource allocations or scheduling related to downlink resource assignments on the PDSCH, uplink resource grants, and uplink power control commands. The PDCCH can be transmitted prior the PDSCH in each subframe transmitted from the eNodeB to the UE.

The PDCCH signal can be designed to be demodulated at the UE based on a cell-specific reference signal (CRS). However, the use of a CRS does not take into account the increased complexities of advanced LTE systems. For instance, in heterogeneous networks, multiple nodes can simultaneously transmit within a single cell. The use of the cell specific reference signal can limit advanced techniques to increase cell capacity.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 12 depicts a flow chart of a method for physical uplink control channel (PUCCH) resource mapping corresponding to an enhanced physical downlink control channel (ePDCCH) from a node in accordance with an example;

Figure 1:
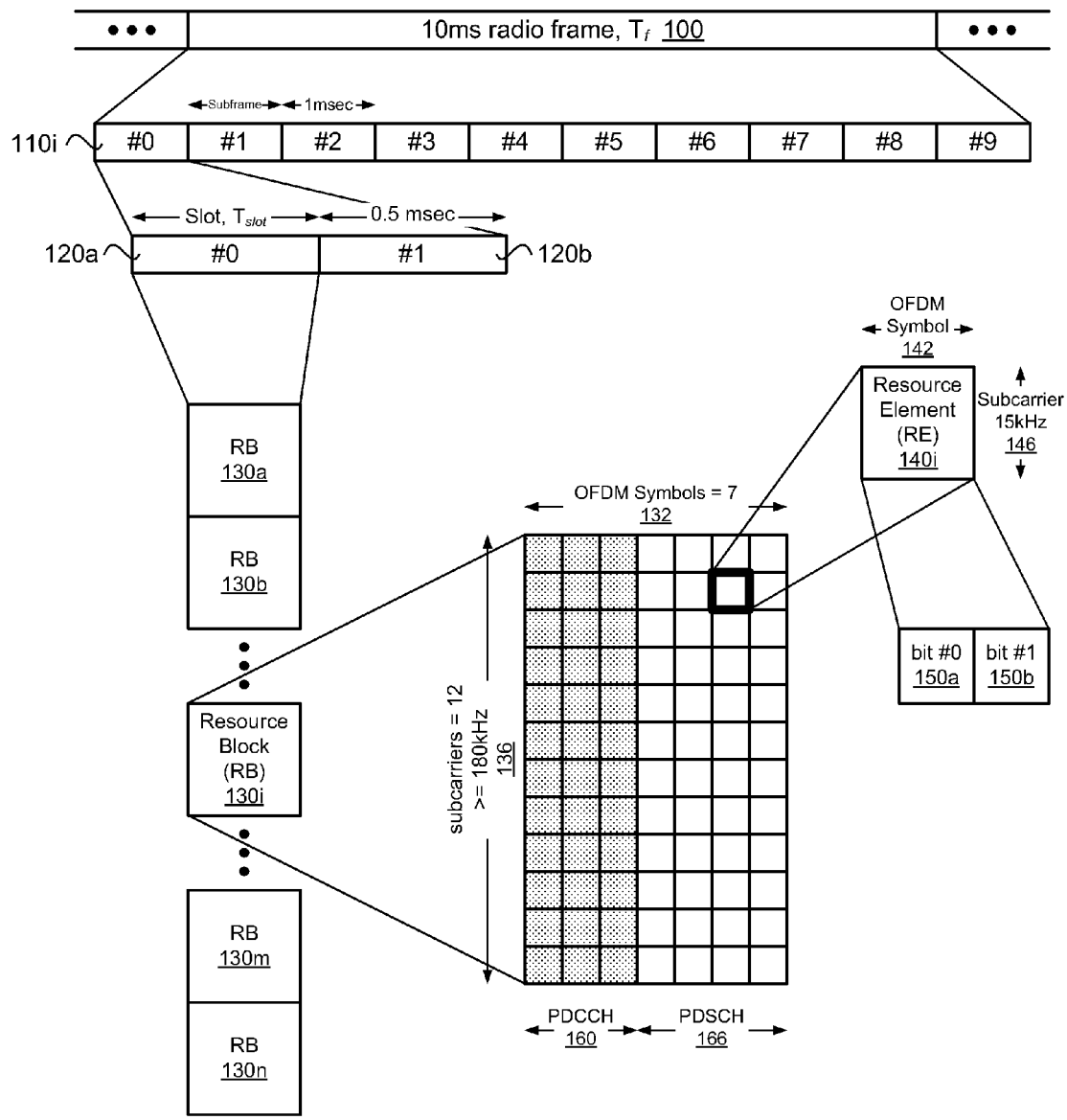
FIG. 1 illustrates a block diagram of radio frame resources (e.g., a resource grid) including a legacy physical downlink control channel (PDCCH) in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

The communication of data on the physical downlink shared channel (PDSCH) can be controlled via a control channel, referred to as a physical downlink control channel (PDCCH). The PDCCH can be used for downlink (DL) and uplink (UL) resource assignments, transmit power commands, and paging indicators. The PDSCH scheduling grant can be designated to a particular wireless device (e.g., UE) for dedicated PDSCH resource allocation to carry UE-specific traffic, or it can be designated to all wireless devices in the cell for common PDSCH resource allocation to carry broadcast control information such as system information or paging.

In one example, the PDCCH and PDSCH can represent elements of a radio frame structure transmitted on the physical (PHY) layer in a downlink transmission between a node (e.g., eNodeB) and the wireless device (e.g., UE) using a generic long term evolution (LTE) frame structure, as illustrated in FIG. 1.

FIG. 1 illustrates a downlink radio frame structure type 2. In the example, a radio frame 100 of a signal used to transmit the data can be configured to have a duration, $T_f$, of 10 milliseconds (ms). Each radio frame can be segmented or divided into ten subframes 110*i* that are each 1 ms long. Each subframe can be further subdivided into two slots 120*a* and 120*b*, each with a duration, $T_{slot}$, of 0.5 ms. The first slot (#0) 120*a* can include a legacy physical downlink control channel (PDCCH) 160 and/or a physical downlink shared channel (PDSCH) 166, and the second slot (#1) 120*b* can include data transmitted using the PDSCH.

Each slot for a component carrier (CC) used by the node and the wireless device can include multiple resource blocks (RBs) 130*a*, 130*b*, 130*i*, 130*m*, and 130*n* based on the CC frequency bandwidth. The CC can have a carrier frequency having a bandwidth and center frequency. Each subframe of the CC can include downlink control information (DCI) found in the legacy PDCCH. The legacy PDCCH in the control region can include one to three columns of the first OFDM symbols in each subframe or physical RB (PRB), when a legacy PDCCH is used. The remaining 11 to 13 OFDM symbols (or 14 OFDM symbols, when legacy PDCCH is not used) in the subframe may be allocated to the PDSCH for data (for short or normal cyclic prefix).

Each RB (physical RB or PRB) 130*i* can include 12-15 kHz subcarriers 136 (on the frequency axis) and 6 or 7 orthogonal frequency-division multiplexing (OFDM) symbols 132 (on the time axis) per slot. The RB can use seven OFDM symbols if a short or normal cyclic prefix is employed. The RB can use six OFDM symbols if an extended cyclic prefix is used. The resource block can be mapped to 84 resource elements (REs) 140*i* using short or normal cyclic prefixing, or the resource block can be mapped to 72 REs (not shown) using extended cyclic prefixing. The RE can be a unit of one OFDM symbol 142 by one subcarrier (i.e., 15 kHz) 146.

Each RE can transmit two bits 150*a* and 150*b* of information in the case of quadrature phase-shift keying (QPSK) modulation. Other types of modulation may be used, such as 16 quadrature amplitude modulation (QAM) or 64 QAM to transmit a greater number of bits in each RE, or bi-phase shift keying (BPSK) modulation to transmit a lesser number of bits (a single bit) in each RE. The RB can be configured for a downlink transmission from the eNodeB to the UE, or the RB can be configured for an uplink transmission from the UE to the eNodeB.

Figure 2:
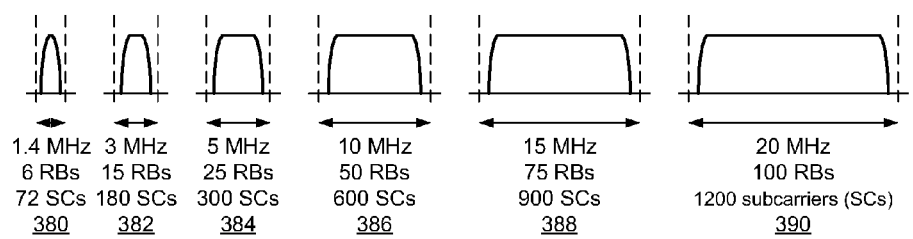
FIG. 2 illustrates a block diagram of various component carrier (CC) bandwidths in accordance with an example.

Each wireless device may use at least one signal bandwidth, carrier bandwidth, or component carrier (CC), as illustrated in FIG. 2. For example, the LTE CC bandwidths can include: 1.4 MHz 380, 3 MHz 382, 5 MHz 384, 10 MHz 386, 15 MHz 388, and 20 MHz 390. The 1.4 MHz CC can include 6 RBs comprising 72 subcarriers. The 3 MHz CC can include 15 RBs comprising 180 subcarriers. The 5 MHz CC can include 25 RBs comprising 300 subcarriers. The 10 MHz CC can include 50 RBs comprising 600 subcarriers. The 15 MHz CC can include 75 RBs comprising 900 subcarriers. The 20 MHz CC can include 100 RBs comprising 1200 subcarriers.

The data carried on the PDCCH can be referred to as downlink control information (DCI). Multiple wireless devices can be scheduled in one subframe of a radio frame. Therefore, multiple DCI messages can be sent using multiple PDCCHs. The DCI information in a PDCCH can be transmitted using one or more control channel elements (CCE). A CCE can be comprised of a group of resource element groups (REGs). A legacy CCE can include up to nine REGs. Each REG can be comprised of four resource elements (REs). Each resource element can include two bits of information when quadrature modulation is used. Therefore, a legacy CCE can include up to 72 bits of information. When more than 72 bits of information are needed to convey the DCI message, multiple CCEs can be employed. The use of multiple CCEs can be referred to as an aggregation level. In one example, the aggregation levels can be defined as 1, 2, 4 or 8 consecutive CCEs allocated to one PDCCH.

The legacy PDCCH can create limitations to advances made in other areas of wireless communication. For example, mapping of CCEs to subframes in OFDM symbols is typically spread over the control region to provide spatial diversity. However, no beam forming diversity may be possible with the current mapping procedures.

Moreover, the capacity of the legacy PDCCH may not be sufficient for advanced control signaling. For instance, networks may be configured as heterogeneous networks (HetNets) can include a number of different kinds of nodes in a single macro cell serving area. More wireless devices can be served simultaneously by macro and pico cells in the HetNet. The PDCCH can be designed to demodulate based on cell-specific reference signals (CRS), which can make fully exploring cell splitting gain difficult. The legacy PDCCH may not be adequate to convey the information needed to allow a wireless device to take advantage of the multiple transmission nodes in the HetNet to increase bandwidth and decrease battery usage at the wireless device.

In addition, the use of multi-user multiple-input multiple-output (MU-MIMO), machine to machine communication (M2M), PDSCH transmission in a multicast\broadcast single-frequency network, and cross carrier scheduling in carrier aggregation can require increased capacity for the PDCCH. The use of UE specific reference signals (UERS) in PDCCH demodulation at the wireless device can allow the use of multiple nodes in the HetNet. Rather than relying on a single common reference symbol (e.g., CRS) for an entire cell, each reference symbol can be UE specific (e.g., UERS).

For example, more wireless devices (e.g., UEs) can be scheduled per sub-frame for a MU-MIMO operation, which can increase the PDCCH resource demand for downlink scheduling. The legacy PDCCH design with a maximum PDCCH size of 3 OFDM symbols may not meet the increased PDCCH resource demand, which can consequently limit a gain from MU-MIMO.

A PDCCH extension, called enhanced PDCCH (ePDCCH or E-PDCCH) located in the PDSCH region can use PRB-based (instead of a CCE-based PDCCH design) multiplexing to increase the PDCCH capacity and improve enhanced inter-cell interference coordination (eICIC) support in HetNet scenarios. A legacy PDCCH can be limited in performing inter-cell interference coordination (ICIC) due to PDCCH interleaving of the control channel elements (CCEs) used for the transmission of DCI formats in PDCCH, which can be distributed over an entire bandwidth (BW). Conversely, the enhanced PDCCH (E-PDCCH) in the PDSCH region can be designed using a PRB-based scheme to support frequency-domain ICIC.

In an example, ICIC can be used to decrease interference between neighboring cells or nodes (e.g., coordination nodes or cooperation nodes) by lowering the power of a part of the subchannels in the frequency domain which then can be received close to the node. The subchannels do not interfere with the same subchannels used in neighboring cells and thus, data can be sent to mobile devices with less interference on the subchannels close to the cell.

Another ICIC technique is enhanced ICIC (eICIC) used in the time domain for heterogeneous networks (HetNets), where a high power macro cell can be complemented with low power nodes such as pico cells (hotspots in shopping centers or at airports) or femto cells (hotspots in small areas such as homes or businesses). The low power nodes can exist inside a macro cell coverage area. The macro cell can transmit long range high power signals, and the low power nodes can transmit low power signals over short distances. In an example to mitigate interference between the macro cell and the several low power nodes located within the macro cell coverage area, eICIC can coordinate the blanking of sub-frames in the time domain in the macro cell. As used herein, a cell can refer to the node (e.g., eNB) configured to communicate with wireless devices within a geographic region that is referred to as a cell coverage area.

The enhanced PDCCH (ePDCCH) can use the REs in an entire PRB or PRB pair (where a PRB pair is two contiguous PRBs using the same subcarrier's subframe) to overcome the limitations of the legacy PDCCH, which uses just the first one to three columns of OFDM symbols in a first slot PRB in a subframe. Accordingly, the ePDCCH can be configured with increased capacity to allow advances in the design of cellular networks and to minimize currently known challenges.

Unlike the legacy PDCCH, the ePDCCH can be mapped to the same REs or region in a PRB as the PDSCH, but in different PRBs. In an example, the PDSCH and the ePDCCH may not be multiplexed within a same PRB (or a same PRB pair). Thus if one PRB (or one PRB pair) contains an ePDCCH, the unused REs in the PRB (or PRB pair) may be blanked, since the REs may not be used for the PDSCH.

Figure 3:
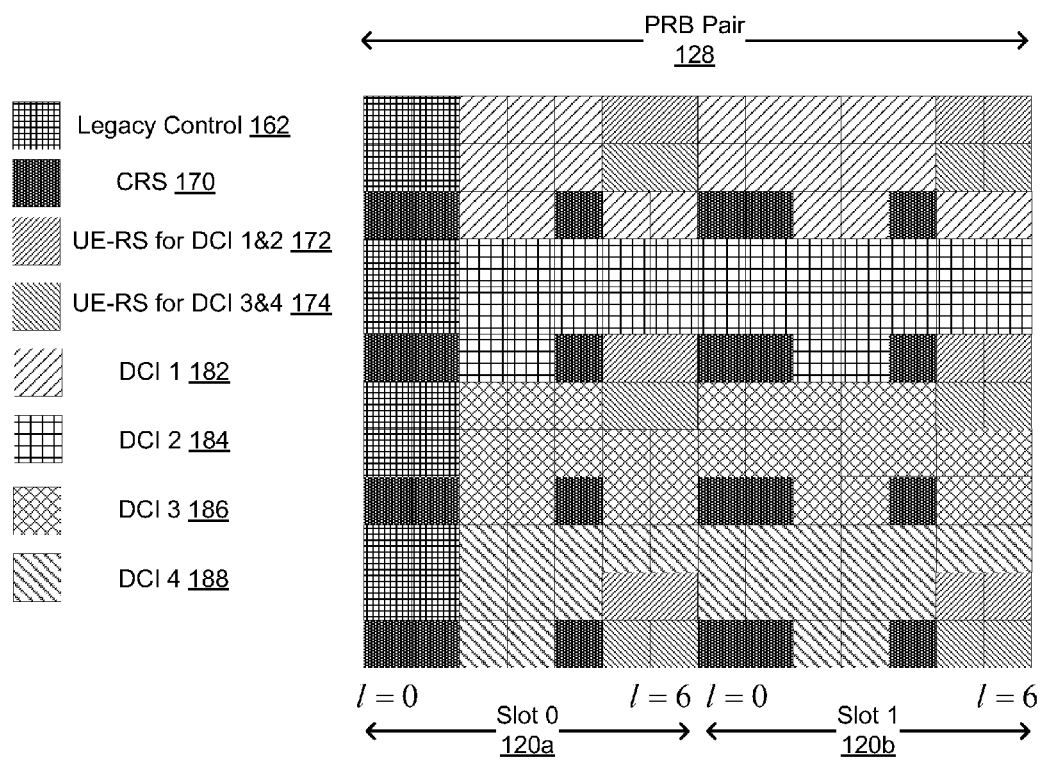
FIG. 3 illustrates a block diagram of multiplexing four localized aggregation level one control channel elements (CCE) associated with downlink control information (DCI) into one physical resource block (PRB) pair in accordance with an example.

FIG. 3 illustrates 4 DCIs 182, 184, 186, and 188 of an ePDCCH in a PRB pair 128. Each DCI of the ePDCCH can be transmitted by at least one CCE, and each CCE can include a plurality of REGs, and each REG can include a plurality of REs. FIG. 3 illustrates a multiplexing pattern of an ePDCCH when multiple aggregation level one (AGL1) localized CCEs are multiplexed in one PRB pair. An aggregation level one CCE (e.g., a single CCE) can include a DCI, so four CCEs can include four separate DCIs. In another example (not shown), an aggregation level two CCE (e.g., two CCEs) can include one DCI. The PRB pair can also include legacy control 162 (e.g., legacy PDCCH) and reference signals, such as cell-specific reference signals (CRS) 170 and UE-specific reference signals (UERS) 172 and 174, used for demodulation and channel estimation. In an example, DCI 1 and DCI 2 can use UERS 172, which can be different from the UERS 174 used by DCI 3 and DCI 4.

Figure 4:
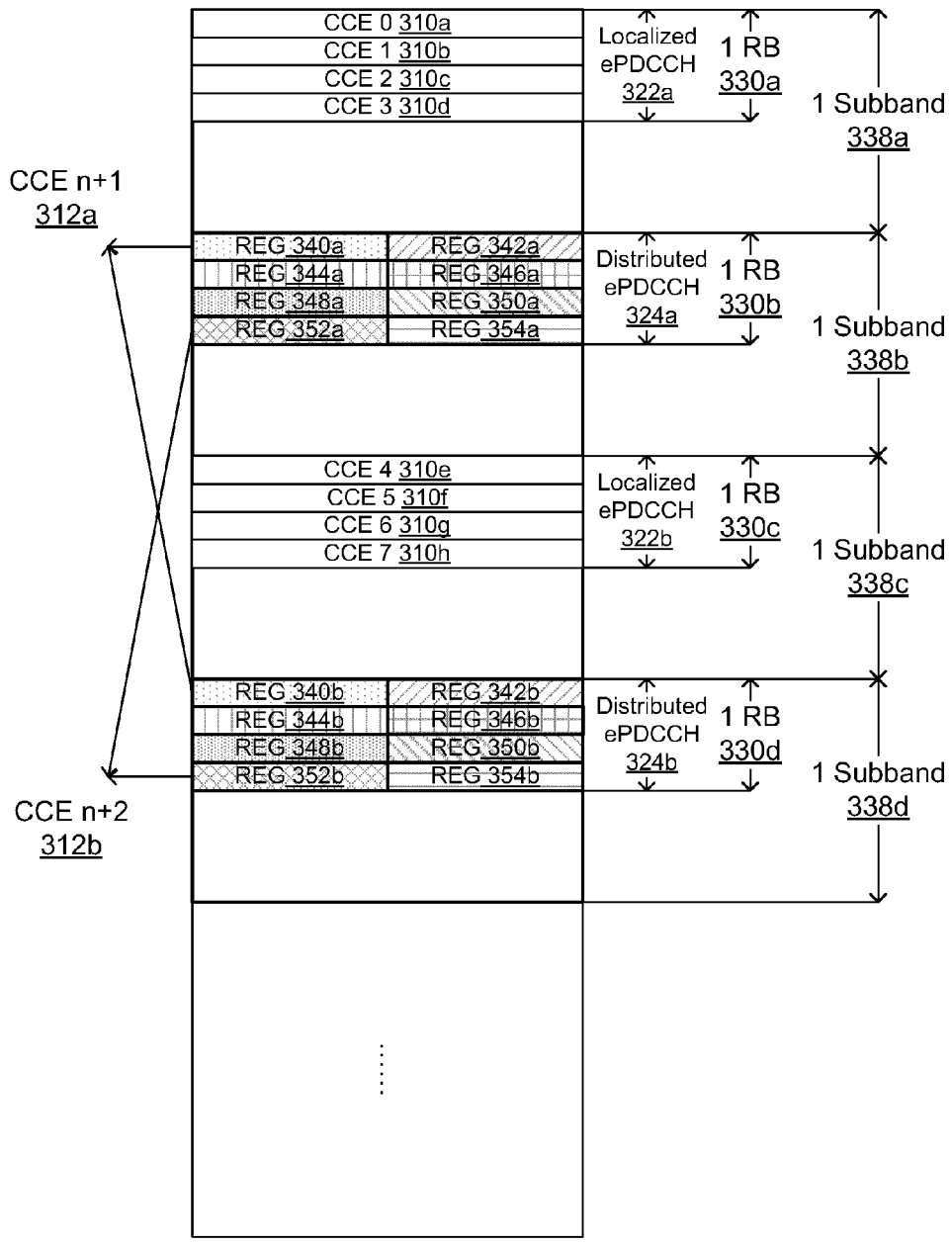
FIG. 4 illustrates a block diagram of control channel elements (CCE) and resource element groups (REG) mapped to a subframe using localized enhanced physical downlink control channels (ePDCCH) and distributed ePDCCH in accordance with an example.
Figure 5:
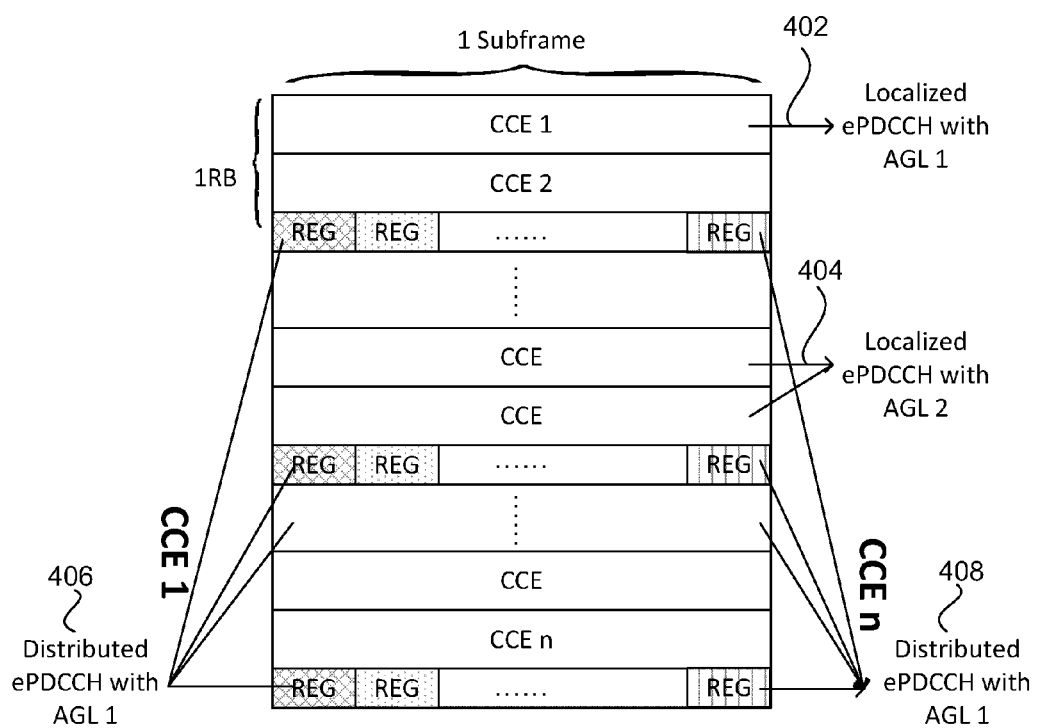
FIG. 5 illustrates a block diagram of an enhanced physical downlink control channel (ePDCCH) mapped to a subframe using localized ePDCCH and distributed ePDCCH in accordance with an example.

The PRB or PRB pair can be used to support both localized ePDCCH and distributed ePDCCH transmissions. FIGS. 4 and 5 illustrate localized ePDCCH and distributed ePDCCH in a slot or a subframe. In a localized ePDCCH 332a-b, the entire CCE 310a-h may be within a PRB 330a and 330c (or PRB pair) within a sub-band 338a and 338c, as illustrated in FIG. 4. In an example, the REGs (or REs) of the localized CCE can be contiguous to each other, which may be followed by a subsequent CCE. In a distributed ePDCCH 324a-b, the REGs 340a-b, 342a-b, 344a-b, 346a-b, 348a-b, 350a-b, 352a-b, and 354a-b of the CCE 312a-b can be distributed over multiple PRBs 330b and 330d (or PRB pairs). The REG(s) 340a in one PRB 330b and the REG(s) 340b in another PRB 330d can form the CCE 312a for the DCI or the distributed ePDCCH. In distributed ePDCCH, the REGs for a CCE can be distributed over two or more PRBs (or two or more PRB pairs). In an example, the REGs of the CCEs used in the distributed ePDCCH can be distributed over different sub-bands 338b and 338d.

FIG. 5 provides another example of a localized ePDCCH and a distributed ePDCCH mapped into CCEs, REGs, and REs within a subframe. In the example of FIG. 5, each resource block pair can comprise two resource blocks (RB or PRB), each having the same subcarriers, located in a first and second slot in the subframe of a radio frame, as shown in FIG. 1. Each RB can include at least one CCE. The CCE may be in a defined location within the RB. However, the CCE may include REGs that are located throughout the resource block. Each REG may include four REs. However, based on system requirements, a REG may include more or less REs. In an example, the REs located in a REG can be contiguous in at least one of frequency and time. In another example, the REs located in a REG may be separated in time and/or frequency. The number of REGs in a CCE may be a fixed number, such as nine. Alternatively, the number of REGs may vary based on DCI data load requirements (i.e., the amount of DCI data), or other competing requirements in the RB, such as physical control format indicator channel (PCFICH) requirements, physical hybrid-ARQ indicator channel (PHICH) requirements, and resource symbol requirements for data allocated within each resource block. The CCE may be mapped across a slot boundary in the physical resource block pair.

A localized ePDCCH 402 having aggregation level (AGL) one can be mapped to a single CCE, which can be mapped to a single RB, as shown in FIG. 5. Similarly, a localized ePDCCH 404 with an aggregation level of two may be mapped to two contiguous CCEs in a RB. For a distributed ePDCCH 406 and 408, the CCE(s) (e.g. CCE 1 and CCE N) can mapped to a plurality of REGs in different RBs in different frequency carriers and subcarriers. For example, the REGs for the CCE N can be distributed in frequency. The frequency separation of the REGs can provide a frequency diversity gain. In an example, each REG in a CCE may be mapped to a separate RB, although more than one REG may be mapped to a same RB as another REG. A greater frequency diversity gain that can occur with widely distributed the REGs. The REGs in CCE 1 and CCE N may have the same distribution (shown) or different distribution (not shown) amongst RBs in a subframe. While the REGs illustrated in the distributed ePDCCH 406 and 408 are each shown to be in the same time position within a RB, for each respective CCE, a same time position within a RB for the distributed ePDCCH is not required. The distributed REGs in CCE 1 and CCE N may be in a different temporal location within a resource block. Each CCE in a subframe may have a same number of REGs or a different number of REGs. The distributed ePDCCH can have an aggregation level of one. The aggregation level of one implies that the DCI information can be mapped to a single CCE.

The distribution of the REGs in a CCE over frequency to different resource blocks in a subframe can provide an increase in frequency diversity gain. FIG. 5 illustrates a distributed ePDCCH 406 and 408 transmission.

In another example, when the ePDCCH has an aggregation level greater than one (e.g., aggregation level 2, 4, or 8) the CCE can include localized CCE or distributed CCEs. A localized CCE can be CCEs (for an ePDCCH with an aggregation level greater than one) that are contiguous to each other, which may be followed by a subsequent CCE in time or frequency. A distributed CCE can be CCEs (for an ePDCCH with an aggregation level greater than one) that are non-contiguous or CCEs distributed over multiple PRBs (or PRB pairs).

Figure 6:
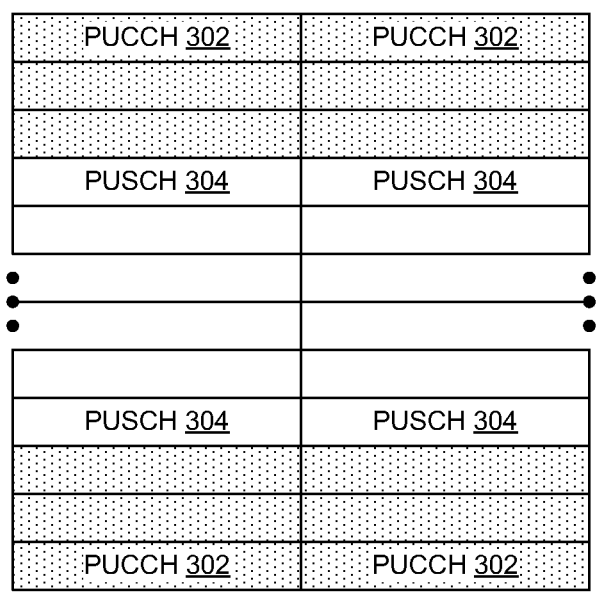
FIG. 6 illustrates a block diagram of physical uplink control channel (PUCCH) resources mapping in a legacy LTE system in accordance with an example.

Using an ePDCCH can change a physical uplink control channel (PUCCH) resource assignment, as compared to a legacy PDCCH. As shown in the FIG. 6, a PUCCH 302 resource assignment for a dynamic uplink (UL) acknowledgment/negative acknowledgment (ACK/NACK) for a legacy PDCCH can be jointly determined by a lowest CCE index (e.g., $n_{CCE}$) and a dynamic and/or semi-static boundary index (e.g., $N_{PRB,ePDCCH}^{offset}$ or $N_{ePUCCH}^{(1)}$) configured by higher-layer signaling, such as radio resource control (RRC) signaling. For example in legacy LTE, a resource index $n_{PUCCH}^{(1)}$ for a dynamic ACK/NACK in the form of uplink control information (UCI) formats 1/1a/1b can be implicitly derived from $n_{PUCCH}^{(1)} = n_{CCE} + N_{PUCCH}^{(1)}$ where $n_{CCE}$ is the number of the first CCE (i.e., a lowest CCE index used to construct the PDCCH) used for transmission of a corresponding DCI assignment and $N_{PUCCH}^{(1)}$ (see $N_{PUCCH}^{offset}$ 256 of FIG. 9) is a PUCCH resource value configured by higher layers, such as RRC signaling. The superscript "(1)" can refer to UCI formats 1/1a/1b. The PUCCH resource allocation can be derived from a legacy PDCCH CCE number. Because the ePDCCH can use a different structure from the PDCCH located in the legacy PDSCH region, the legacy PUCCH ACK/NACK resource mapping may not be used to map a PUCCH resource for a hybrid automatic repeat request-acknowledgement (HARQ-ACK) transmission corresponding to a downlink (DL) grant transmitted in ePDCCH because of an unavailable linkage between an ePDCCH resource index and the legacy PUCCH ACK/NACK resource. FIG. 6 illustrates both the PUCCH and PUSCH 304 resources mapping assignment for a dynamic uplink (UL) acknowledgment/negative acknowledgment (ACK/NACK), other control information, and other PUSCH data.

The PUCCH can include an uplink physical channel carrying uplink control information (UCI) including channel quality indicators (CQI), hybrid automatic retransmission request (HARQ) ACK/NACK (A/N), and uplink scheduling requests. Uplink control information (UCI) can include control signaling (e.g., ACKnowledgement (ACK)/Negative ACK (NACK) and channel quality indicator (CQI)) transmitted from a wireless device (e.g., UE) to a node (e.g., eNodeB).

The ACK can be a signal transmitted to indicate that one or more blocks of data (e.g., ePDCCH PRB) have been successfully received and decoded. The NACK can be a signal transmitted to indicate that one or more blocks of data have not been successfully received and decoded.

PUCCH resources mapping based on ePDCCH can be applied to a frequency-division duplexing (FDD) system (i.e., method-1) or time-division duplexing (TDD) system (i.e., method-2). Time-division duplexing (TDD) is an application of time-division multiplexing (TDM) to separate downlink and uplink signals. In TDD, downlink signals and uplink signals may be carried on a same carrier frequency where the downlink signals use a different time interval from the uplink signals, so the downlink signals and the uplink signals do not generate interference for each other. TDM is a type of digital multiplexing in which two or more bit streams or signals, such as a downlink or uplink, are transferred apparently simultaneously as sub-channels in one communication channel, but are physically taking turns on the channel. In frequency-division duplexing (FDD), an uplink transmission and a downlink transmission can operate using different frequency carriers. In FDD, interference can be avoided because the downlink signals use a different frequency carrier from the uplink signals.

The PUCCH resources can be mapped based on a number of scheduled wireless devices (instead of active wireless devices in a cell), where the PUCCH resource can be mapped depending on a corresponding ePDCCH lowest PRB index. PUCCH collisions can be reduced or minimized when the PUCCH resources mapping uses an ePDCCH lowest PRB index, which can be different from a PDCCH lowest CCE index.

Figure 7:
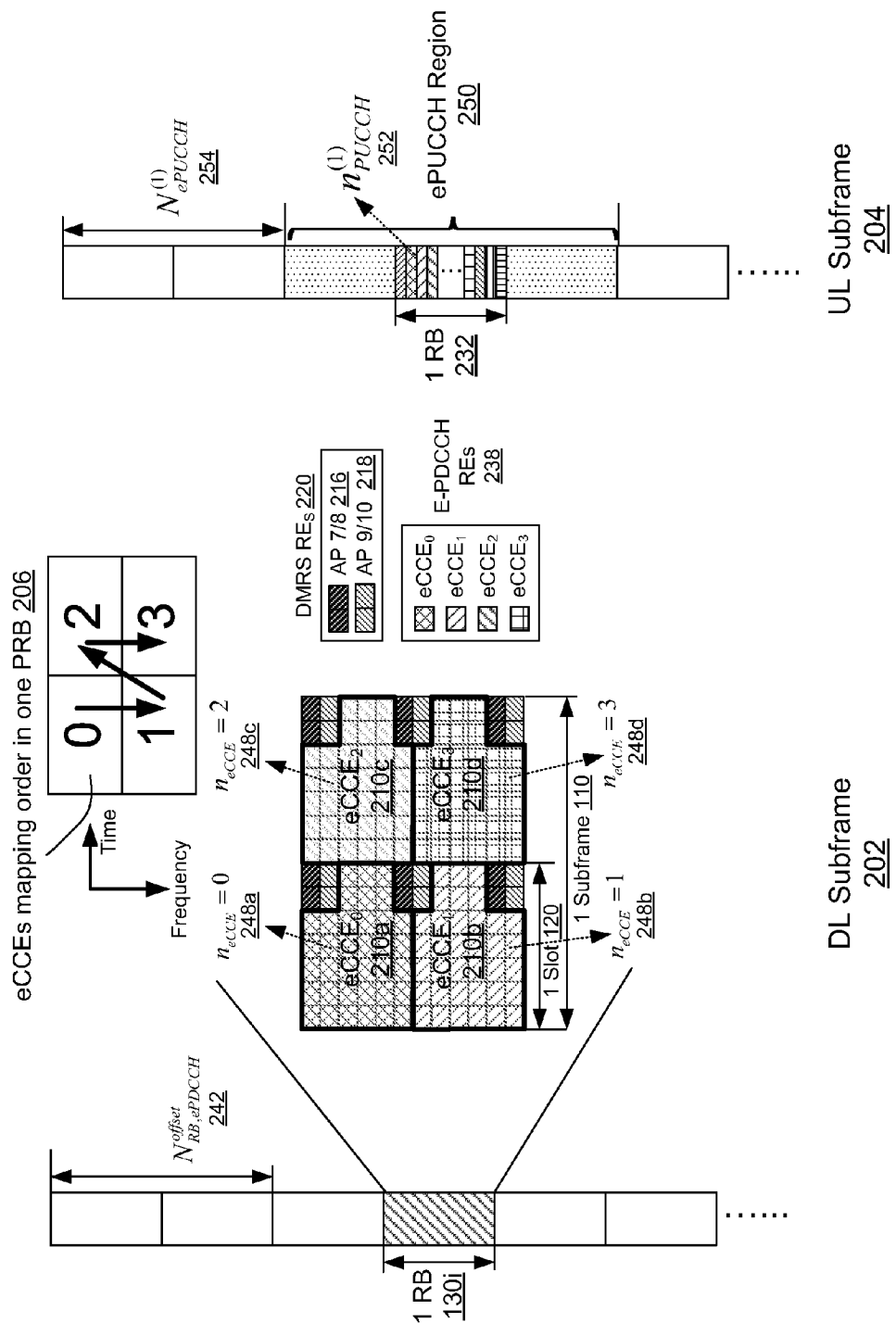
FIG. 7 illustrates a block diagram of an enhanced physical downlink control channel (ePDCCH) in a downlink subframe and a corresponding physical uplink control channel (PUCCH) resources mapping in accordance with an example.

As illustrated in FIG. 7, an enhanced control channel element (eCCE) 201a-d can consists of a set of predefined resource elements (REs) 238 within a PRB pair in a downlink subframe 202 that can be used to define the mapping of an enhanced control channel (e.g., ePDCCH) to resource elements. The eCCE may contain REs that are reserved for other signals, such as a CRS, a channel-state information reference signal (CSI-RS), a UE-specific reference signal (UERS), a demodulation reference signal (DMRS) 220, and/or other reference signals. In the example shown in FIG. 7, the DMRS use antenna ports (AP) 7 and 8 216 and AP 9 and 10 218. In case of multiple eCCEs multiplexed in one PRB 130i, the REs mapping of each eCCE 206 with an increasing index can follow a frequency-first mapping order to leverage frequency diversity in case that an eCCE aggregation level is greater than one, as shown in FIG. 7. Within each eCCE, the REs mapping can follow timing-first mapping (not shown) within a slot 120.

For FDD (i.e., method-1), a PUCCH resource mapping method in an uplink subframe 204 corresponding to ePDCCH for HARQ-ACK feedback can use a first PRB index $I_{PRB\_ePDCCH}^{lowest\_index}$ of ePDCCH detected as represented by the following equation, referred to herein as Equation 1:

$$n_{PUCCH}^{(1)} = E \cdot (I_{PRB\_ePDCCH}^{lowest\_index} - N_{PRB,ePDCCH}^{offset}) + n_{eCCE} + N_{ePUCCH}^{(1)} \quad \text{[Equation 1]}$$

where $0 \leq n_{eCCE} < E$ is the index number of first eCCE in a lowest PRB (i.e., first PRB) used for a transmission of the corresponding PDCCH in downlink subframe, and $N_{ePUCCH}^{(1)} > 0$ 254 and $N_{PRB,ePDCCH}^{offset} > 0$ 242 are configured by higher layers in UE-specific or cell-specific way (e.g. for a specified RS), $I_{PRB\_ePDCCH}^{lowest\_index}$ is the lowest PRB index including at least one eCCE of ePDCCH resources, E is the total number of eCCE in one PRB.

The number of the first eCCE $n_{eCCE}$ can be a lowest CCE index used to construct the ePDCCH used for transmission of a corresponding DCI assignment. In the example shown in FIG. 7, E can be 4 for $eCCE_0$-$eCCE_3$, where $eCCE_0$ 210a is represented by $n_{eCCE}=0$ 248a, $eCCE_1$ 210b is represented by $n_{eCCE}=1$ 248b, $eCCE_2$ 210c is represented by $n_{eCCE}=2$ 248c, $eCCE_3$ 210d is represented by $n_{eCCE}=3$ 248d. The eCCE within the lowest PRB index can include part or full of ePDCCH resources. The wireless device (e.g., UE) can use the PUCCH resource $n_{PUCCH}^{(1)}$ 252 in an ePUCCH region 250 mapped with Equation 1 for transmission of HARQ-ACK if a corresponding PDCCH detected according to the pre-defined HARQ-timing. The PUCCH resource $n_{PUCCH}^{(1)}$ can be mapped in a RB 232 of the uplink subframe. The E, $I_{PRB\_ePDCCH}^{lowest\_index}$, $N_{PRB,ePDCCH}^{offset}$, $n_{eCCE}$, and $N_{ePUCCH}^{(1)}$ can be positive integers.

Figure 8:
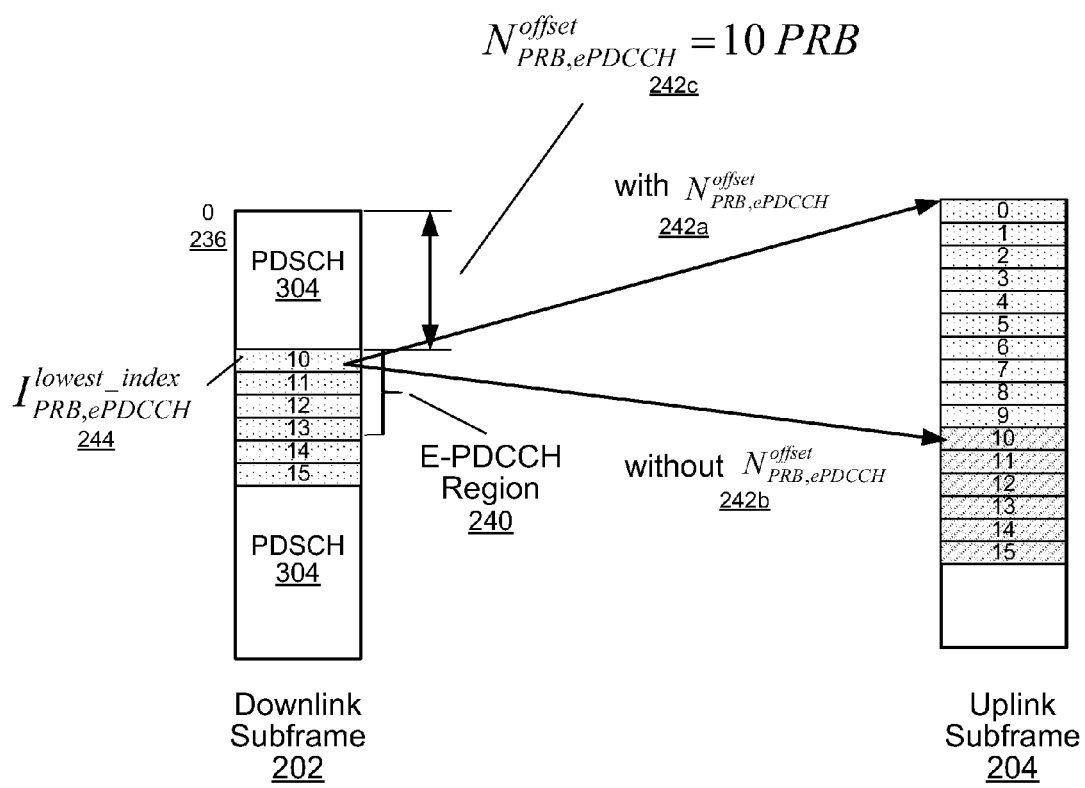
FIG. 8 illustrates a block diagram of a starting PRB index $N_{PRB,ePDCCH}^{offset}$ for an enhanced physical downlink control channel (ePDCCH) region in an uplink subframe in accordance with an example.

As illustrated in FIG. 8, the $N_{PRB,ePDCCH}^{offset}$ parameter 242 can refer to the ePDCCH region starting PRB index in the uplink subframe 204. The E-PDCCH region 240 in the downlink subframe 202 may not start from an index 0 236 because the node may attempt to select better PRBs for an E-PDCCH transmission based on CQI feedback from the wireless device. For example, the PRB staring from PRB 10 to PRB 15 (with a lowest PRB index $I_{PRB\_ePDCCH}^{lowest\_index}$ 244 including at least one eCCE of E-PDCCH resources) may have a much better channel quality for the E-PDCCH transmission. When the wireless device performs the PUCCH mapping for the E-PDCCH, the wireless device can take into account the offset value of the E-PDCCH (e.g., $N_{PRB,ePDCCH}^{offset}=10$ 242c) and shift the mapped PUCCH, which can reduce uplink control overhead. FIG. 8 illustrates the PUCCH resource $n_{PUCCH}^{(1)}$ mapping with $N_{PRB,ePDCCH}^{offset}$ 242a and without $N_{PRB,ePDCCH}^{offset}$ 242b.

Figure 9:
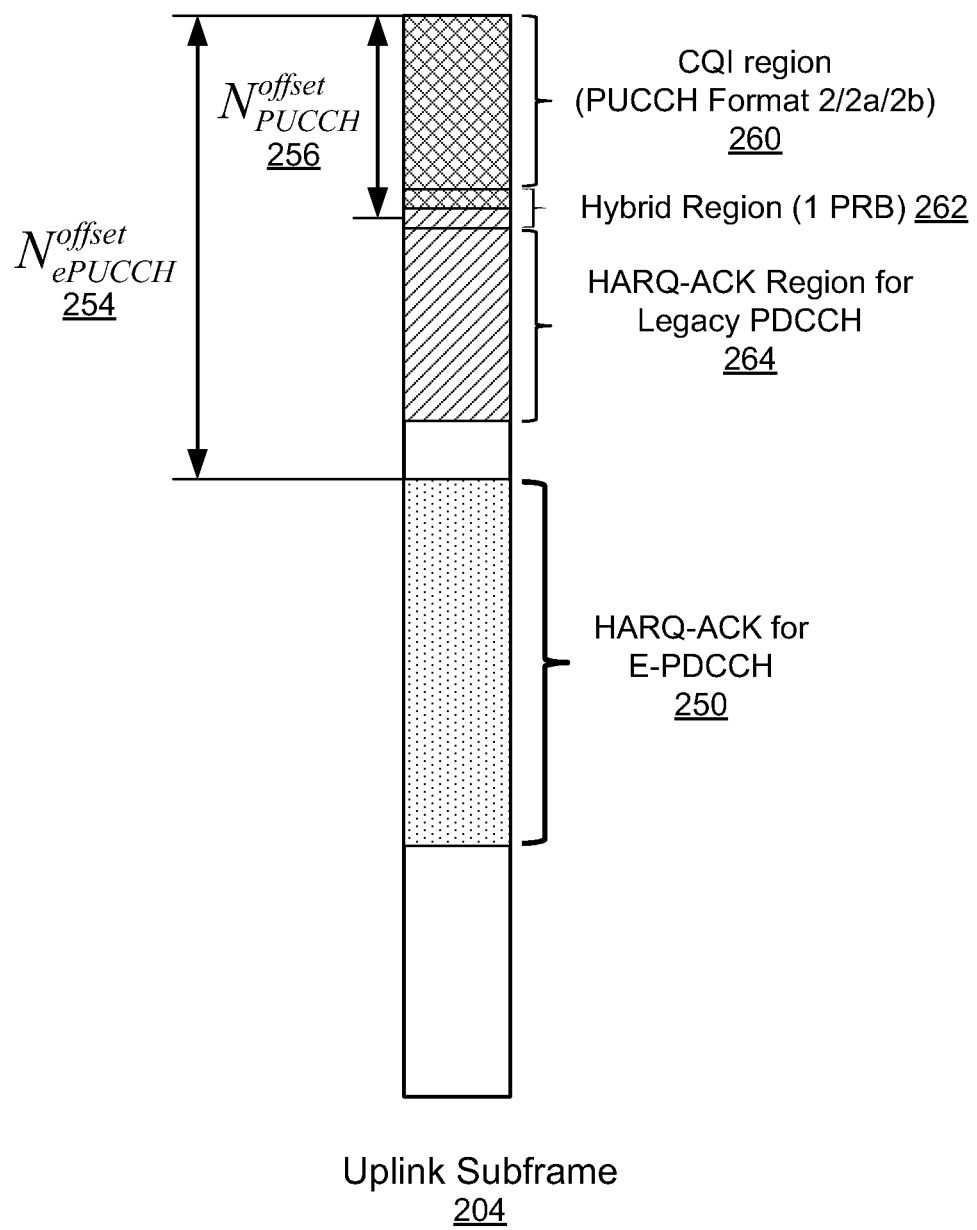
FIG. 9 illustrates a block diagram of an uplink subframe with physical uplink control channel (PUCCH) hybrid automatic repeat request-acknowledgement (HARQ-ACK) feedback for an enhanced physical downlink control channel (ePDCCH) in accordance with an example.

The starting index $N_{ePUCCH}^{(1)}$ 254 of ePUCCH resources for HARQ-ACK transmission with PUCCH format 1a/1b can be similar to the legacy starting index $N_{PUCCH}^{(1)}$ 256 of ePUCCH resources for HARQ-ACK transmission in the uplink subframe, where $N_{PUCCH}^{(1)}$ and $N_{ePUCCH}^{(1)}$ are positive integers, as shown in FIG. 9.) In an example, uplink control signaling can be divided generally into two categories: Downlink data associated control signaling, such as HARQ-ACK, and non-associated control signaling such as CQI, precoding matrix indicator (PMI), rank indicator (RI), and/or scheduling request (SR).

Non-associated control signaling region, such as CQI, can be transmitted on band-edge RBs in a CQI region 260 using PUCCH format 2/2a/2b followed by a mixed PUCCH PRB of CQI PUCCH format 2/2a/2b AND SR/HARQ-ACK format 1a/1b/1 in a hybrid region 262. The starting index $N_{PUCCH}^{(1)}$ can be used to indicate the starting index of PUCCH resources in a HARQ-ACK region for legacy PDCCH 264 for HARQ-ACK transmission with PUCCH format 1a/1b. Similarly, the starting index $N_{ePUCCH}^{(1)}$ can indicate the starting index of PUCCH resources associated with HARQ-ACK for ePDCCH 250 since the legacy PUCCH region can exist in the same uplink subframe, as shown in FIG. 9. The node (e.g., eNB) can signal the offset value $N_{ePUCCH}^{(1)}$ for ePDCCH mapping to avoid a PUCCH collision between E-PDCCH and legacy PDCCH regions.

For example, without $N_{ePUCCH}^{(1)}$ in Equation 1, the $eCCE_0$ in PRB 0 of E-PDCCH can be associated with PUCCH channel 0, which can generate an unavoidable collision with $CCE_0$ (cce_0) in the legacy PDCCH region if a legacy DCI is transmitted in the legacy PDCCH region. To avoid the signal collision, the node can set the starting index $N_{ePUCCH}^{(1)}$ based on a reserved maximum PUCCH channel for the legacy PDCCH region. For example, if the node knows the maximum PUCCH channels for legacy PDCCH region is up to PUCCH channel 100, then the node can set the $N_{ePUCCH}^{(1)}=101$ by reserving the first 100 PUCCH channels for legacy PDCCH region, which can minimize collisions between HARQ-ACK for legacy PDCCH and HARQ-ACK for ePDCCH.

The starting index $N_{PUCCH}^{(1)}$ and $N_{ePUCCH}^{(1)}$ can indicate the PUCCH channel index offset, where starting index $N_{PUCCH}^{(1)}$ and $N_{ePUCCH}^{(1)}$ can have units of PUCCH channel instead of PRB. In an example, one PRB can accommodate up to 36 PUCCH channels. The starting index $N_{PUCCH}^{(1)}$ and $N_{ePUCCH}^{(1)}$ can correspond to a PUCCH channel index of the UL subframe, not a PRB or an eCCE of the DL subframe.

The concept of REG may be used with legacy PDCCH, instead of PRB. The legacy PDCCH can be transmitted in CCEs, where each CCE can corresponds to sets of four physical resources elements known as REGs. E-PDCCH can be associated with PRB, which can be different from the legacy PDCCH region.

Figure 10:
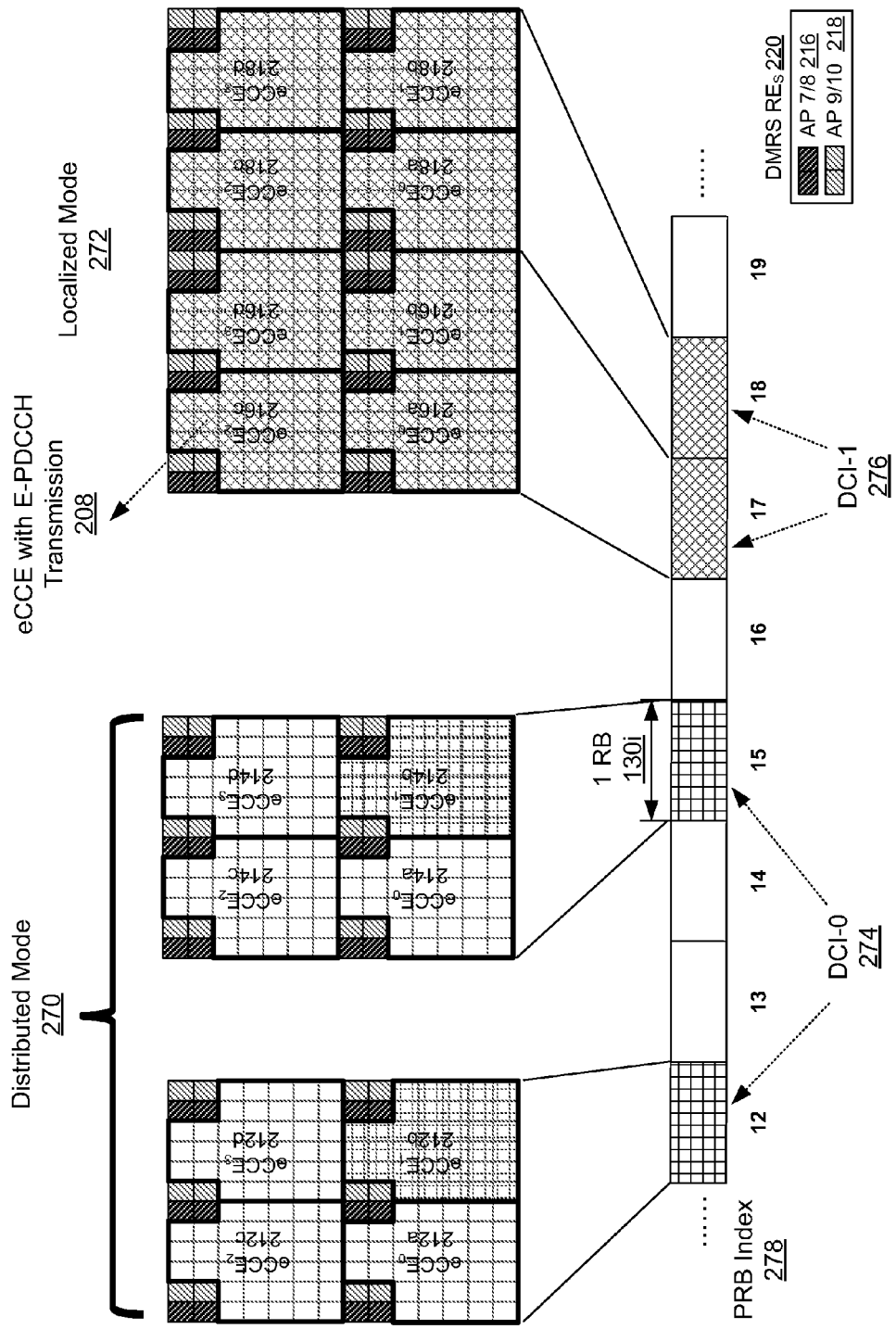
FIG. 10 illustrates a block diagram of physical uplink control channel (PUCCH) resources mapping corresponding to an enhanced physical downlink control channel (ePDCCH) for hybrid automatic repeat request-acknowledgement (HARQ-ACK) feedback for frequency-division duplexing (FDD) in accordance with an example.

FIG. 10 illustrates an embodiment of method-1 for FDD, where $N_{ePUCCH}^{(1)}=36$, $E=4$, and $N_{PRB,ePDCCH}^{offset}=0$. At least one of two transmission modes of ePDCCH, such as localized and distributed transmission of the enhanced control channel, can be used. For a distributed mode 270 (e.g., mode 1), the ePDCCH transmission for a DCI (e.g., DCI-0 274) can be mapped into two PRBs (e.g., PRB 12 and 15), according to a predefined, predetermined, and/or signaled distributed transmission pattern. In an example, a predefined or signaled distribution transmission pattern can specify PRB spacing of two PRB between the ePDCCH PRBs (e.g., every third PRB is used for a distributed ePDCCH for a DCI). Based on the definition of each parameter in Equation 1, the parameters value used for PUCCH resource mapping can be set as $I_{PRB\_ePDCCH}^{lowest\_index}=12$ based on the PRB index 278 and $n_{eCCE}=1$ for $eCCE_1$ 212b and 214b in PRB 12 and 15. The corresponding PUCCH resource $n_{PUCCH}^{(1)}$ for distributed mode of the ePDCCH illustrated in FIG. 10 can be calculated as: $n_{PUCCH}^{(1)}=4\cdot(12-0)+1+36=85$ PUCCH channel. In distributed mode, eCCEs 212a-d and 214a-d for different Das can be transmitted together.

For a localized mode (continuous mode) 272 (e.g., mode 2), the eCCE with ePDCCH transmission 208 for a DCI (e.g., DCI-1 276) can be mapped into two continuous PRBs (e.g., PRB 17 and 18) including eight eCCEs 216a-d and 218a-d (e.g., aggregation level 8). The parameters value used for PUCCH resource mapping can be set $I_{PRB\_ePDCCH}^{lowest\_index}=17$ and $n_{eCCE}=0$ based on the ePDCCH detected. The corresponding PUCCH resource $n_{PUCCH}^{(1)}$ for the localized mode of the ePDCCH illustrated in FIG. 10 can be calculated (using Equation 1) as: $n_{PUCCH}^{(1)}=4\cdot(17-0)+0+36=104$ PUCCH channel.

In an another embodiment, TDD ACK/NACK bundling or TDD ACK/NACK multiplexing (i.e., method-2) can be used to map PUCCH resources corresponding to ePDCCH for HARQ-ACK feedback in an uplink subframe n 282 (FIG. 11) as represented by Equation 2.

$$n_{PUCCH}^{(1)} = E \cdot (\Sigma_{i=0}^{m-1} N_{PRB,ePDCCH}^{i} + (I_{PRB\_ePDCCH}^{lowest\_index} - N_{PRB,ePDCCH}^{offset})) + n_{eCCE} + N_{ePUCCH}^{(1)}$$ [Equation 2]

Where $n_{eCCE}$ is the number of first eCCE used for transmission of a corresponding ePDCCH in subframe $n-k_m$ and the corresponding $0 \leq m \leq M-1$, where $k_m$ is the smallest value in set K such that the wireless device detects a PDCCH in subframe $n-k_m$.

Because TDD uses the same frequency carrier for both downlink and uplink transmissions, feedback (e.g., ACK/NACK feedback) on the uplink transmission can be transmitted on subframes allocated for uplink transmissions based on an uplink-downlink (UL-DL) subframe configuration. Table 1 illustrates seven UL-DL configurations used in LTE, where "D" represents a downlink subframe, "S" represents a special subframe, and "U" represents an uplink subframe.

TABLE 1

| Uplink-downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

As illustrated by Table 1, UL-DL configuration 0 can include 6 uplink subframes in frames 2, 3, 4, 7, 8, and 9, and provide feedback for downlink and special subframes 0, 1, 5, and 6; and UL-DL configuration 5 can include one uplink subframe in frame 2 and provide feedback for downlink and special subframes 0, 1, 3-9. Each uplink subframe n can be associated with a downlink subframe based on the uplink-downlink configuration, where each uplink subframe n can have a downlink association set index $K \in \{k_0, k_1, \ldots k_{M-1}\}$ where M is defined as the number of elements in set K, as illustrated by Table 2.

TABLE 2

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

The Table 2 shows examples of downlink subframe bundling in an uplink subframe handling ACK/NACK feedback for certain downlink subframe(s). For example, in uplink-downlink configuration 4, uplink subframe 2 (subframe n) handles ACK/NACK feedback for downlink and special subframes which are {12, 8, 7, 11} subframes (subframes $k_m$) earlier than uplink subframe 2 (i.e., downlink and special subframes {0, 4, 5, 1} (or downlink and special subframes $n-k_m$)) and M equals 4. Uplink subframe 3 (subframe n) handles ACK/NACK feedback for downlink subframes which are {6, 5, 4, 7} subframes (subframes $k_m$) earlier than uplink subframe 3 (i.e., downlink subframes {7, 8, 9, 6} (or downlink subframes $n-k_m$)) and M equals 4. For uplink-downlink configuration 5 uplink subframe 2, M equals 9. For uplink-downlink configuration 0, uplink subframe 2, M equals one, and uplink subframe 3, M equals zero. Depending on the uplink-downlink configuration one uplink subframe may be responsible for ACK/NACK feedback for one or multiple downlink subframes. In certain situations, even distribution between uplink subframe responsibility can be desired to reduce situations where one uplink subframe is responsible for ACK/NACK feedback for a large number of downlink and special subframes. Table 3 illustrates the prior downlink subframe numbers for which the uplink subframe n provides ACK/NACK feedback.

TABLE 3

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 0 | — | — | 1 | — | 5 |
| 1 | — | — | 5, 6 | 9 | — | — | — | 0, 1 | 4 | — |
| 2 | — | — | 4, 5, 8, 6 | — | — | — | — | 9, 0, 3, 1 | — | — |
| 3 | — | — | 5, 6, 1 | 7, 8 | 9, 0 | — | — | — | — | — |
| 4 | — | — | 0, 4, 5, 1 | 7, 8, 9, 6 | — | — | — | — | — | — |
| 5 | — | — | 9, 0, 3, 4, 5, 7, 8, 1, 6 | — | — | — | — | — | — | — |
| 6 | — | — | 5 | 6 | 9 | — | — | 0 | 1 | — |

Referring back the parameters of Equation 2, $I_{PRB\_ePDCCH}^{lowest\_index}$ is the lowest PRB index including at least one eCCE of ePDCCH resources in subframe n–$k_m$. The parameter $N_{PRB,ePDCCH}^{i}>0$ can either be cell-specific or UE-specific parameter (or other specific parameter determined by a RS), which indicates the ePDCCH RBs used for transmission of ePDCCH in downlink subframe n–$k_i$ from a system perspective or UE-specific perspective, where i is an integer increment of the summation. The ePDCCH RB parameter $N_{PRB,ePDCCH}^{i}$ can be signaled semi-statically by high layer signaling, such as RRC signaling, or dynamically signaled in each downlink subframe through a special physical channel, such as a physical control format indicator channel (PCFICH) which can be used to signal the length of the PDCCH or ePDCCH. Alternatively, the ePDCCH RB parameter $N_{PRB,ePDCCH}^{i}$ can be or determined by the wireless device implicitly according to a system bandwidth as shown in Equation 3.

$$N_{PRB,ePDCCH}^{i}=N_{RB}^{DL} \quad \text{[Equation 3]}$$

Where $N_{RB}^{DL}$ is the number of PRB depending on the system downlink bandwidth configuration (see FIG. 2). In an example, the definitions of parameters used in Equation 2 can be the same as those used in Equation 1, if defined in Equation 1. In an example, the parameters of Equations 1 and 2 can be varied (e.g., removed), which may limit PUCCH resource utilization. The reserved PUCCH resources can be minimized by proper setting of $N_{PRB,ePDCCH}$ by reserving just enough PUCCH channels for ACK/NACK feedback for legacy PDCCH and other control information. With a reduced number of reserved PUCCH resources, more uplink RBs can be used for PUSCH transmission, which can increase the uplink system throughput.

Figure 11:
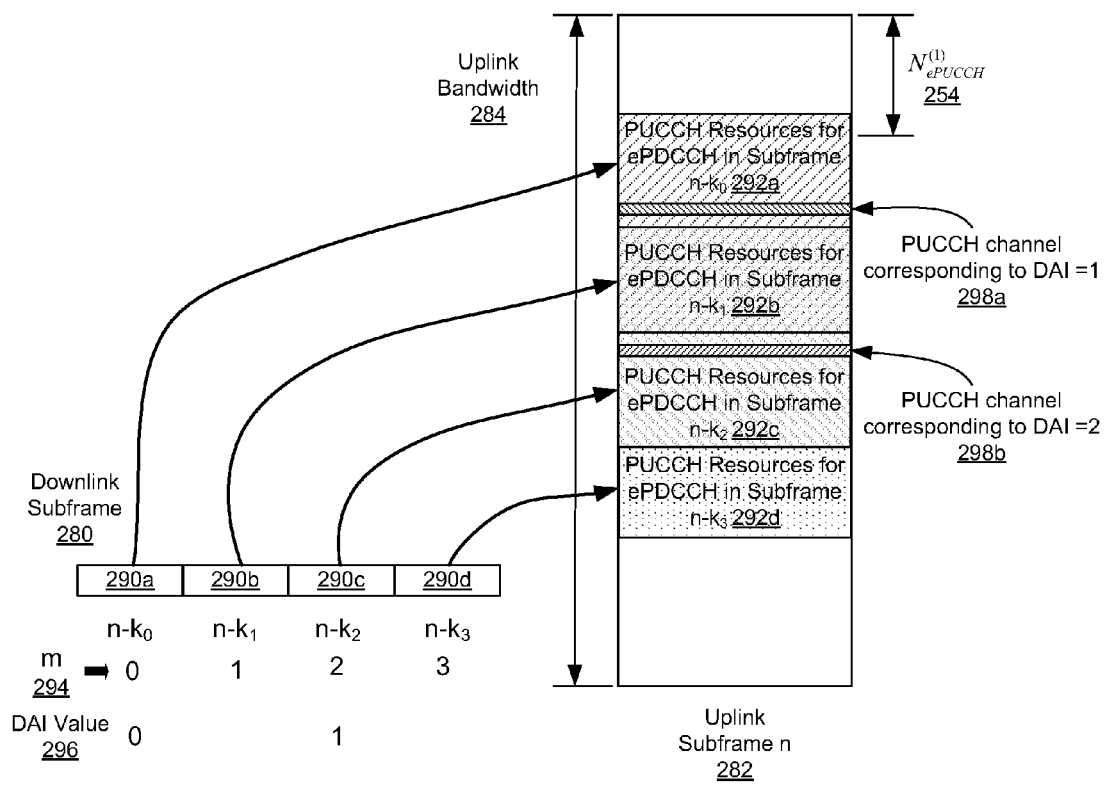
FIG. 11 illustrates a block diagram of physical uplink control channel (PUCCH) resources mapping corresponding to an enhanced physical downlink control channel (ePDCCH) for hybrid automatic repeat request-acknowledgement (HARQ-ACK) feedback for time-division duplexing (TDD) in accordance with an example.

FIG. 11 illustrates an embodiment of method-1 for PUCCH resources 292a-d mapping using TDD with TDD ACK/NACK bundling or TDD ACK/NACK multiplexing for an uplink subframe n 282 in a uplink bandwidth 284 where M=4. In the example of illustrated in FIG. 11, the uplink subframe n can provide ACK/NACK feedback for 4 downlink subframes 280 (e.g., n–$k_0$ through n–$k_3$ 290a-d for m={0, 1, 2, 3} 294).

In another example using method-2, the uplink subframe n 282 can include a PUCCH channel corresponding to a downlink assignment index (DAI) 298a-b. If M=2 (a different M associated with DAI) and ePDCCH transmission occurs in subframe n–$k_0$ and n–$k_2$ separately, the PUCCH resource based on the PRB index in "DAI=2" downlink subframe can be used for HARQ-ACK feedback according to the method-2. For example, PUCCH channel corresponding to DAI=1 298a can be transmitted in PUCCH resources for ePDCCH in subframe n–$k_0$ 292a and PUCCH channel corresponding to DAI=2 298b can be transmitted in PUCCH resources for ePDCCH in subframe n–$k_0$ 292c. A downlink assignment index (DAI) can be a field in the downlink resource grant signaled to a wireless device, indicating how many subframes in a previous time window contained transmissions to that wireless device. DAI can be applicable in time domain duplex (TDD) mode, and can enable the wireless device to determine whether wireless device has received all the downlink subframes or transport blocks for which the wireless device transmits a combined ACK/NACK.

Another example provides a method 500 for physical uplink control channel (PUCCH) resource mapping corresponding to an enhanced physical downlink control channel (ePDCCH) from a node, as shown in the flow chart in FIG. 12. The method may be executed as instructions on a machine, where the instructions are included on at least one computer readable medium. The method includes the operation of mapping a PUCCH resource $n_{PUCCH}^{(1)}$ corresponding to an ePDCCH for PUCCH resource hybrid automatic repeat request-acknowledgement (HARQ-ACK) feedback, wherein the PUCCH resource $n_{PUCCH}^{(1)}$ is determined using a lowest PRB index including at least one enhanced control channel element (eCCE) of ePDCCH resources and a total number of eCCE in one physical resource block (PRB), as in block 510.

In another example, the PUCCH resource $n_{PUCCH}^{(1)}$ can be determined by using at least one of starting physical resource block (PRB) index for an ePDCCH region, a lowest PRB index including at least one enhanced control channel element (eCCE) of ePDCCH resources, a total number of eCCE in one physical resource block (PRB), a starting PRB index for an ePDCCH region, and a first eCCE index number in a lowest PRB used for transmission of the corresponding ePDCCH in a downlink subframe.

In a frequency-division duplexing (FDD) example, the PUCCH resource $n_{PUCCH}^{(1)}$ can be represented by $$n_{PUCCH}^{(1)}=E \cdot (I_{PRB\_ePDCCH}^{lowest\_index} - N_{PRB,ePDCCH}^{offset}) + n_{eCCE} + N_{ePUCCH}^{(1)}$$

where E is the total number of eCCE in one PRB, $I_{PRB\_ePDCCH}^{lowest\_index}$ is the lowest PRB index including at least one eCCE of ePDCCH resources, $N_{PRB,ePDCCH}^{offset}$ is a starting PRB index for an ePDCCH region, $n_{eCCE}$ is a first eCCE index number in a lowest PRB used for transmission of the corresponding ePDCCH in a downlink subframe where $0 \leq n_{eCCE} < E$, and $N_{ePUCCH}^{(1)}$ is a starting PUCCH channel index for an ePUCCH region in an uplink subframe and is configured by high layers for each user equipment (UE). The starting PUCCH channel index $N_{ePUCCH}^{(1)}$ for the ePUCCH region in the uplink subframe can be greater than zero ($N_{ePUCCH}^{(1)}>0$), the starting PRB index $N_{PRB,ePDCCH}^{offset}$ for an ePDCCH region can be greater than zero ($N_{PRB,ePDCCH}^{offset}>0$), and the lowest PRB index $I_{PRB\_ePDCCH}^{lowest\_index}$ including at least one eCCE of ePDCCH resources can be configured by radio resource control (RRC) signaling as cell-specific parameter or a UE-specific parameter, and E can be a fixed parameter defined by a specification, such as an LTE specification.

In a time-division duplexing (TDD) example, the PUCCH resource $n_{PUCCH}^{(1)}$ is represented by $$n_{PUCCH}^{(1)} = E \cdot \left( \sum_{i=0}^{m-1} N_{PRB,ePDCCH}^{i} + \left( I_{PRB\_ePDCCH}^{lowest\_index} - N_{PRB,ePDCCH}^{offset} \right) \right) + n_{eCCE} + N_{ePUCCH}^{(1)},$$

where E is the total number of eCCE in one PRB, $N_{PRB,ePDCCH}^{offset}$ is a starting PRB index for an ePDCCH region, $N_{ePUCCH}^{(1)}$ is a starting PUCCH channel index for a ePUCCH region in an uplink subframe and is configured by high layers for each user equipment (UE), $I_{PRB\_ePDCCH}^{lowest\_index}$ is a lowest PRB index including at least one eCCE of ePDCCH resources in a downlink subframe n–$k_m$, $n_{eCCE}$ is a first eCCE index number used for transmission of the corresponding ePDCCH in the downlink subframe n–$k_m$ where n is an uplink subframe associated with the downlink subframe n–$k_m$, $k_m$ is a smallest value in a downlink associate set K={$k_0, k_1, \ldots k_{M-1}$} with a ePDCCH in downlink subframe n–$k_m$ where M is the number of elements in the set K and $0 \leq m \leq M-1$, and $N_{PRB,ePDCCH}^{i}$ is a number of ePDCCH PRBs used for transmission of ePDCCH in downlink subframe n–$k_i$. The $N_{PRB,ePDCCH}^{i}$ can be a number $N_{RB}^{DL}$ of PRBs of the downlink bandwidth configuration. The starting PUCCH channel index $N_{ePUCCH}^{(1)}$ for the ePUCCH region in the uplink subframe can be greater than zero ($N_{ePUCCH}^{(1)}>0$), the starting PRB index $N_{PRB,ePDCCH}^{offset}$ for an ePDCCH region can be greater than zero ($N_{PRB,ePDCCH}^{offset}>0$), and the lowest PRB index $I_{PRB\_ePDCCH}^{lowest\_index}$ including at least one eCCE of ePDCCH resources can be configured by radio resource control (RRC) signaling as cell-specific parameter or a UE-specific parameter, and E can be a fixed parameter defined by a specification, such as an LTE specification. The $N_{PRB,ePDCCH}^{i}>0$ can be a cell-specific parameter or a UE-specific parameter configured semi-statically by radio resource control (RRC) signaling or configured dynamically via a physical control format indicator channel (PCFICH). M can be an integer $0 \leq M \leq 9$.

In another example, the ePDCCH can use a localized ePDCCH transmission of the eCCE or a distributed ePDCCH transmission of the eCCE. The PUCCH resource $n_{PUCCH}^{(1)}$ can be a resource index for PUCCH formats 1, 1a, or 1b.

Figure 13:
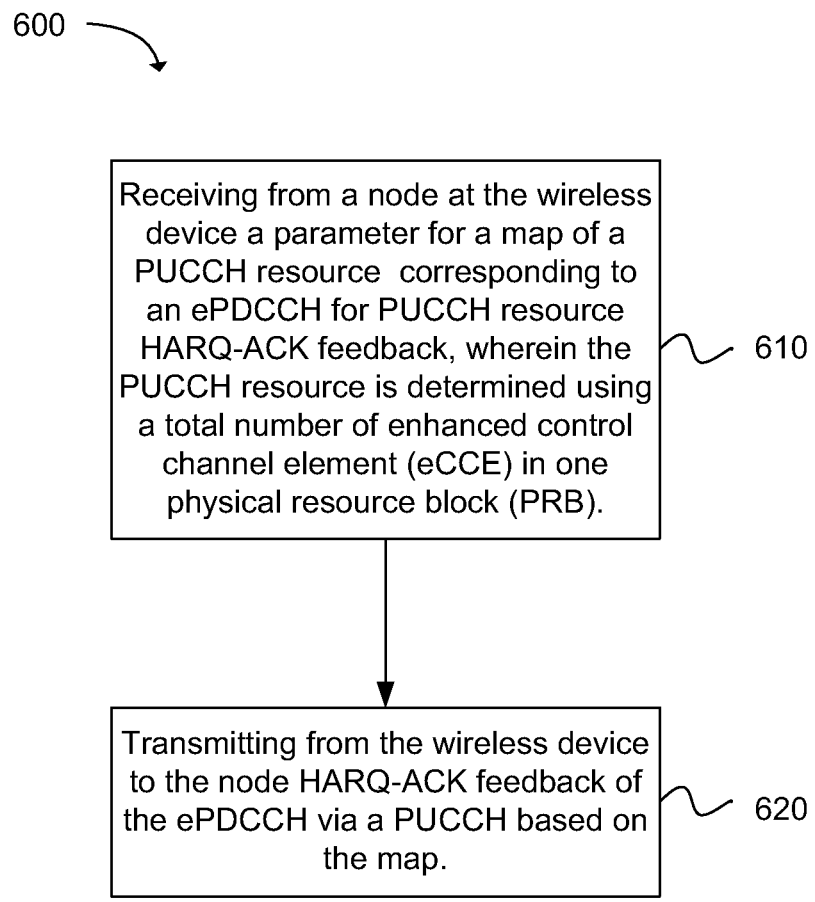
FIG. 13 depicts a flow chart of a method for generating hybrid automatic repeat request-acknowledgement (HARQ-ACK) feedback in physical uplink control channel (PUCCH) corresponding to an enhanced physical downlink control channel (ePDCCH) at a wireless device in accordance with an example.

Another example provides a method 600 for generating hybrid automatic repeat request-acknowledgement (HARQ-ACK) feedback in physical uplink control channel (PUCCH) corresponding to an enhanced physical downlink control channel (ePDCCH) at a wireless device, as shown in the flow chart in FIG. 13. The method may be executed as instructions on a machine, where the instructions are included on at least one computer readable medium or one non-transitory machine readable storage medium. The method includes the operation of receiving from a node at the wireless device a parameter for a map of a PUCCH resource $n_{PUCCH}^{(1)}$ corresponding to an ePDCCH for PUCCH resource HARQ-ACK feedback, wherein the PUCCH resource $n_{PUCCH}^{(1)}$ is determined using a total number of enhanced control channel element (eCCE) in one physical resource block (PRB), as in block 610. The operation of transmitting from the wireless device to the node HARQ-ACK feedback of the ePDCCH via a PUCCH based on the map follows, as in block 620. The parameter for a map of a PUCCH resource $n_{PUCCH}^{(1)}$ can include $N_{PRB,ePDCCH}^{offset}$, $I_{PRB\_ePDCCH}^{lowest\_index}$, and/or $N_{ePUCCH}^{(1)}$. In another example, the wireless device can generate the map of the PUCCH resource $n_{PUCCH}^{(1)}$ based on the parameter.

In another example, the PUCCH resource $n_{PUCCH}^{(1)}$ can be determined by using at least one of starting physical resource block (PRB) index for an ePDCCH region, a lowest PRB index including at least one enhanced control channel element (eCCE) of ePDCCH resources, a total number of eCCE in one physical resource block (PRB), a starting PRB index for an ePDCCH region, and a first eCCE index number in a lowest PRB used for transmission of the corresponding ePDCCH in a downlink subframe.

In a frequency-division duplexing (FDD) example, the PUCCH resource $n_{PUCCH}^{(1)}$ can be represented by $$n_{PUCCH}^{(1)} = E \cdot (I_{PRB\_ePDCCH}^{lowest\_index} - N_{PRB,ePDCCH}^{offset}) + n_{eCCE} + N_{ePUCCH}^{(1)}$$

where E is the total number of eCCE in one PRB, $I_{PRB\_ePDCCH}^{lowest\_index}$ is the lowest PRB index including at least one eCCE of ePDCCH resources, $N_{PRB,ePDCCH}^{offset}$ is a starting PRB index for an ePDCCH region, $n_{eCCE}$ is a first eCCE index number in a lowest PRB used for transmission of the corresponding ePDCCH in a downlink subframe where $0 \leq n_{eCCE} < E$, and $N_{ePUCCH}^{(1)}$ is a starting PUCCH channel index for a ePUCCH region in an uplink subframe and is configured by high layers for each user equipment (UE). The $N_{ePUCCH}^{(1)}$ can be configured by high layers for each wireless device (e.g., UE).

In a time-division duplexing (TDD) example, the PUCCH resource $n_{PUCCH}^{(1)}$ is represented by $$n_{PUCCH}^{(1)} = E \cdot \left( \sum_{i=0}^{m-1} N_{PRB,ePDCCH}^{i} + (I_{PRB\_ePDCCH}^{lowest\_index} - N_{PRB,ePDCCH}^{offset}) \right) + n_{eCCE} + N_{ePUCCH}^{(1)},$$

where E is the total number of eCCE in one PRB, $N_{PRB,ePDCCH}^{offset}$ is a starting PRB index for an ePDCCH region, $N_{ePUCCH}^{(1)}$ is a starting PUCCH channel index for a ePUCCH region in an uplink subframe and is configured by high layers for each user equipment (UE), $I_{PRB\_ePDCCH}^{lowest\_index}$ is a lowest PRB index including at least one eCCE of ePDCCH resources in a downlink subframe $n-k_m$, $n_{eCCE}$ is a first eCCE index number used for transmission of the corresponding ePDCCH in the downlink subframe $n-k_m$ where n is an uplink subframe associated with the downlink subframe $n-k_m$, $k_m$ is a smallest value in a downlink associate set $K=\{k_0, k_1, \ldots k_{M-1}\}$ with a ePDCCH in downlink subframe $n-k_m$ where M is the number of elements in the set K and $0 \leq m \leq -1$, and $N_{PRB,ePDCCH}^{i}$ is a number of ePDCCH PRBs used for transmission of ePDCCH in downlink subframe $n-k_i$. The $N_{ePUCCH}^{(1)}$ can be configured by high layers for each wireless device (e.g., UE).

The method can further include the wireless device receiving from the node the ePDCCH, and the wireless device can determine whether the ePDCCH was properly received, wherein the HARQ-ACK feedback of the ePDCCH is based on the reception of the ePDCCH. In another example, the ePDCCH can use a localized ePDCCH transmission of the eCCE or a distributed ePDCCH transmission of the eCCE. The PUCCH resource $n_{PUCCH}^{(1)}$ can be a resource index for PUCCH formats 1, 1a, or 1b.

Figure 14:
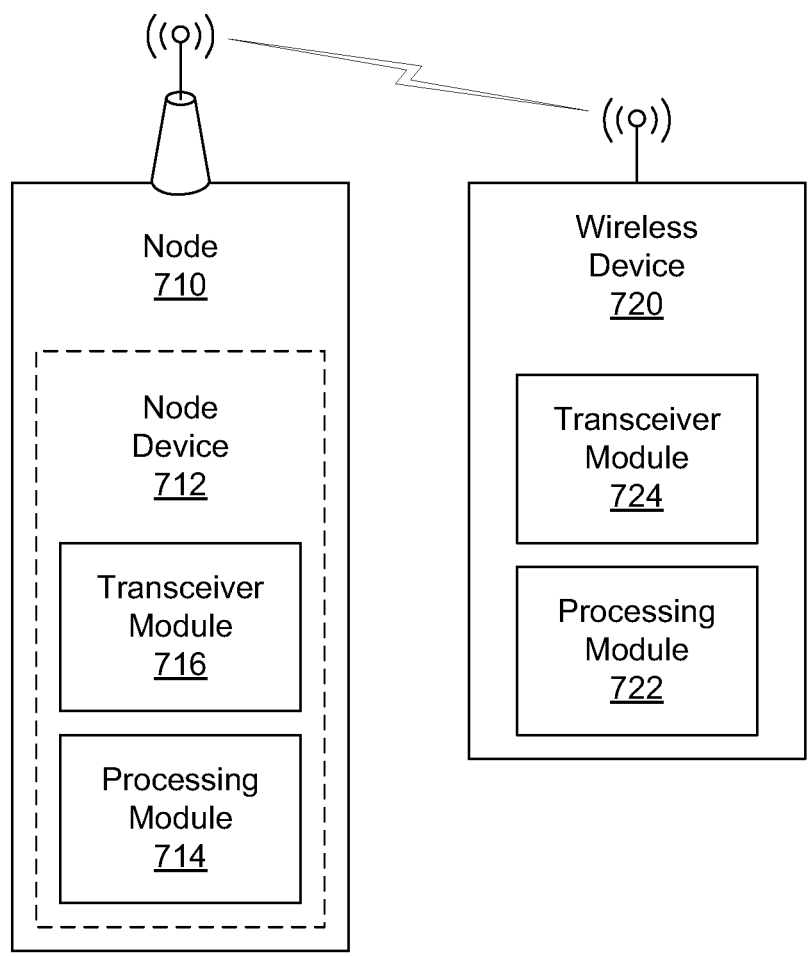
FIG. 14 illustrates a block diagram of a node and a wireless device in accordance with an example.

FIG. 14 illustrates an example node 710 and an example wireless device 720. The node can include a node device 712. The node device or the node can be configured to communicate with the wireless device. The node device can be configured to map a physical uplink control channel (PUCCH) resource using corresponding to an enhanced physical downlink control channel (ePDCCH). The node device can include a processing module 714 and a transceiver module 716. The processing module, which can include a PUCCH resource mapper, can be configured to map a PUCCH resource $n_{PUCCH}^{(1)}$ corresponding to an ePDCCH for PUCCH resource hybrid automatic repeat request-acknowledgement (HARQ-ACK) feedback. The PUCCH resource $n_{PUCCH}^{(1)}$ can be determined using a lowest PRB index including at least one enhanced control channel element (eCCE) of ePDCCH resources. The transceiver module can be configured to communicate with a wireless device and to send a parameter of the map of the PUCCH resource $n_{PUCCH}^{(1)}$ to the wireless device and receive hybrid automatic repeat request-acknowledgement (HARQ-ACK) feedback via a PUCCH based on the map. The parameter for a map of a PUCCH resource $n_{PUCCH}^{(1)}$ can include $N_{PRB,ePDCCH}^{offset}$, $I_{PRB\_ePDCCH}^{lowest\_index}$, and/or $N_{ePUCCH}^{(1)}$.

In another example, the PUCCH resource $n_{PUCCH}^{(1)}$ can be determined by using at least one of starting physical resource block (PRB) index for an ePDCCH region, a lowest PRB index including at least one enhanced control channel element (eCCE) of ePDCCH resources, a total number of eCCE in one physical resource block (PRB), a starting PUCCH channel index for an ePDCCH region, and a first eCCE index number in a lowest PRB used for transmission of the corresponding ePDCCH in a downlink subframe.

In a frequency-division duplexing (FDD) example, the PUCCH resource $n_{PUCCH}^{(1)}$ can be represented by Equation 1, describe above. In a time-division duplexing (TDD) example, the PUCCH resource $n_{PUCCH}^{(1)}$ can be represented by Equation 2, describe above. The transceiver module can be further operable to configure $N_{PRB,ePDCCH}^{i}>0$ semi-statically by radio resource control (RRC) signaling or configure $N_{PRB,ePDCCH}^{i}>0$ dynamically via a physical control format indicator channel (PCFICH) as a cell-specific parameter or a UE-specific parameter. In another example, the ePDCCH can use a localized ePDCCH transmission of the eCCE or a distributed ePDCCH transmission of the eCCE. The PUCCH resource $n_{PUCCH}^{(1)}$ can be a resource index for PUCCH formats 1, 1a, or 1b.

The node 710 can include a base station (BS), a Node B (NB), an evolved Node B (eNB), a baseband unit (BBU), a remote radio head (RRH), a remote radio equipment (RRE), or a remote radio unit (RRU).

The wireless device 720 can include a transceiver module 724 and a processing module 722. The wireless device can be configured to generate hybrid automatic repeat request-acknowledgement (HARQ-ACK) feedback in physical uplink control channel (PUCCH) corresponding to an enhanced physical downlink control channel (ePDCCH). The transceiver module can be configured to receive from a node a parameter for a map of a PUCCH resource $n_{PUCCH}^{(1)}$ corresponding to an ePDCCH for PUCCH resource HARQ-ACK feedback, and transmit to the node HARQ-ACK feedback of the ePDCCH via a PUCCH based on the map. The parameter for a map of a PUCCH resource $n_{PUCCH}^{(1)}$ can include $N_{PRB,ePDCCH}^{offset}$, $I_{PRB\_ePDCCH}^{lowest\_index}$, and/or $N_{ePUCCH}^{(1)}$. In an example, the processing module can be configured to generate the map of the PUCCH resource $n_{PUCCH}^{(1)}$ based on the parameter. In another example, the PUCCH resource $n_{PUCCH}^{(1)}$ can be determined using a starting PUCCH channel index for an ePDCCH region. In another example, the PUCCH resource $n_{PUCCH}^{(1)}$ can be determined by using at least one of starting physical resource block (PRB) index for an ePDCCH region, a lowest PRB index including at least one enhanced control channel element (eCCE) of ePDCCH resources, a total number of eCCE in one physical resource block (PRB), a starting PUCCH channel index for an ePDCCH region, and a first eCCE index number in a lowest PRB used for transmission of the corresponding ePDCCH in a downlink subframe.

In an example, the transceiver module 724 can be further configured to receive from the node the ePDCCH. The processing module 722 can be configured to determine whether the ePDCCH was properly received. The HARQ-ACK feedback of the ePDCCH can be based on the reception of the ePDCCH. In a frequency-division duplexing (FDD) example, the PUCCH resource $n_{PUCCH}^{(1)}$ can be represented by Equation 1, describe above. In a time-division duplexing (TDD) example, the PUCCH resource $n_{PUCCH}^{(1)}$ can be represented by Equation 2, describe above. The transceiver module can be further operable to configure $N_{PRB,ePDCCH}^{i}>0$ semi-statically by radio resource control (RRC) signaling or configure $N_{PRB,ePDCCH}^{i}>0$ dynamically via a physical control format indicator channel (PCFICH) as a cell-specific parameter or a UE-specific parameter. In another example, the ePDCCH can use a localized ePDCCH transmission of the eCCE or a distributed ePDCCH transmission of the eCCE. The PUCCH resource $n_{PUCCH}^{(1)}$ can be a resource index for PUCCH formats 1, 1a, or 1b.

Figure 15:
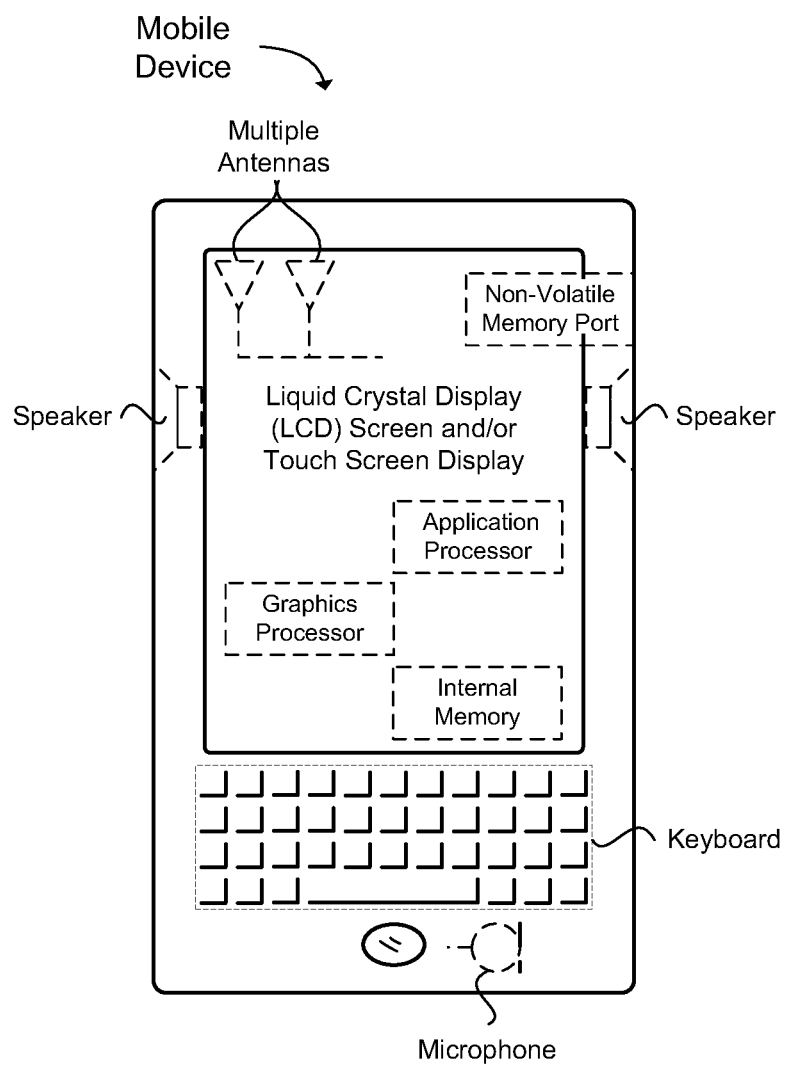
FIG. 15 illustrates a diagram of a wireless device in accordance with an example.

FIG. 15 provides an example illustration of the wireless device, such as an user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard including 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 15 also provides an illustration of a microphone and one or more speakers that can be used for audio input and output from the wireless device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the wireless device. A keyboard may be integrated with the wireless device or wirelessly connected to the wireless device to provide additional user input. A virtual keyboard may also be provided using the touch screen.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, solid state drive, or other medium for storing electronic data. The node and wireless device may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" means that a particular feature, structure, or characteristic described in connection with the example is included in at least one embodiment of the present invention. Thus, appearances of the phrases "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A method for physical uplink control channel (PUCCH) resource mapping corresponding to an enhanced physical downlink control channel (ePDCCH) from a node, comprising:

mapping a PUCCH resource $n_{PUCCH}^{(1)}$ corresponding to an ePDCCH for PUCCH resource hybrid automatic repeat request-acknowledgement (HARQ-ACK) feedback, wherein the PUCCH resource $n_{PUCCH}^{(1)}$ is determined using a lowest PRB index including at least one enhanced control channel element (eCCE) of ePDCCH resources and a total number of eCCE in one physical resource block (PRB), wherein the PUCCH resource $n_{PUCCH}^{(1)}$ is represented by $n_{PUCCH}^{(1)} = E \cdot (I_{PRB\_ePDCCH}^{lowest\_index} - N_{PRB,ePDCCH}^{offset}) + n_{eCCE} + N_{ePUCCH}^{(1)}$ for frequency-division duplexing (FDD), where E is the total number of eCCE in one PRB, $I_{PRB\_ePDCCH}^{lowest\_index}$ is a lowest PRB index including at least one eCCE of ePDCCH resources, $N_{PRB,ePDCCH}^{offset}$ is a starting PRB index for an ePDCCH region, $n_{eCCE}$ is a first eCCE index number in a lowest PRB used for transmission of the corresponding ePDCCH in a downlink subframe $0 \leq n_{eCCE} < E$, and $N_{ePUCCH}^{(1)}$ is a starting PUCCH channel index for an ePUCCH region in an uplink subframe and is configured by high layers for each user equipment (UE); or $$n_{PUCCH}^{(1)} = E \cdot \left( \sum_{i=0}^{m-1} N_{PRB,ePDCCH}^{i} + (I_{PRB\_ePDCCH}^{lowest\_index} - N_{PRB,ePDCCH}^{offset}) \right) + n_{eCCE} + N_{ePUCCH}^{(1)}$$

for time-division duplexing (TDD), where E is the total number of eCCE in one PRB, $N_{PRB,ePDCCH}^{offset}$ is a starting PRB index for an ePDCCH region, $N_{ePUCCH}^{(1)}$ is a starting PUCCH channel index for a ePUCCH region in an uplink subframe and is configured by high layers for each user equipment (UE), $I_{PRB\_ePDCCH}^{lowest\_index}$ is a lowest PRB index including at least one eCCE of ePDCCH resources in a downlink subframe $n-k_m$, $n_{eCCE}$ is a first eCCE index number used for transmission of the corresponding ePDCCH in the downlink subframe $n-k_m$ where n is an uplink subframe associated with the downlink subframe $n-k_m$, $k_m$ is a smallest value in a downlink associate set $K=\{k_0, k_1, \ldots k_{M-1}\}$ with a ePDCCH in downlink subframe $n-k_m$ where M is the number of elements in the set K and $0 \leq m \leq M-1$, and $N_{PRB,ePDCCH}^{i}$ is a number of ePDCCH PRBs used for transmission of ePDCCH in downlink subframe $n-k_i$.

2. The method of claim 1, wherein $N_{ePUCCH}^{(1)} > 0$, $N_{PRB,ePDCCH}^{offset} > 0$, and $I_{PRB\_ePDCCH}^{lowest\_index}$ is configured by radio resource control (RRC) signaling as cell-specific parameter or a UE-specific parameter, and E is a fixed parameter defined by a specification.

3. The method of claim 1, wherein $N_{PRB,ePDCCH}^{i}$ is a number of $N_{RB}^{DL}$ PRBs in accordance with the downlink bandwidth configuration.

4. The method of claim 1, wherein $N_{ePUCCH}^{(1)} > 0$, $N_{PRB,ePDCCH}^{offset} > 0$, and $I_{PRB\_ePDCCH}^{lowest\_index}$ is configured by radio resource control (RRC) signaling as a cell-specific parameter or a UE-specific parameter, and E is a fixed parameter defined by a specification.

5. The method of claim 1, wherein $N_{RRB,ePDCCH}^{i} > 0$ is a cell-specific parameter or a UE-specific parameter configured semi-statically by radio resource control (RRC) signaling or configured dynamically via a physical control format indicator channel (PCFICH).

6. The method of claim 1, wherein M is an integer $0 \le M \le 9$.

7. The method of claim 1, wherein the ePDCCH uses a localized ePDCCH transmission of the eCCE or a distributed ePDCCH transmission of the eCCE.

8. The method of claim 1, wherein the PUCCH resource $n_{PUCCH}^{(1)}$ is a resource index for PUCCH formats 1, 1a, or 1b.

9. At least one non-transitory machine readable storage medium comprising a plurality of instructions adapted to be executed to implement the method of claim 1.

10. A node device of a node configured to map a physical uplink control channel (PUCCH) resource using corresponding to an enhanced physical downlink control channel (ePDCCH), comprising:
a processing module configured to map a PUCCH resources $n_{PUCCH}^{(1)}$ corresponding to an ePDCCH for PUCCH resource hybrid automatic repeat request-acknowledgement (HARQ-ACK) feedback, wherein the PUCCH resource $n_{PUCCH}^{(1)}$ is determined using a lowest PRB index including at least one enhanced control channel element (eCCE) of ePDCCH resources; and
a transceiver module configured to communicate with a wireless device and to send the map of the PUCCH resource $n_{PUCCH}^{(1)}$ to the wireless device and receive hybrid automatic repeat request-acknowledgement (HARQ-ACK) feedback via a PUCCH based on the map,
wherein the PUCCH resource $n_{PUCCH}^{(1)}$ is represented by: $n_{PUCCH}^{(1)} = E \cdot (I_{PRB\_ePDCCH}^{lowest\_index} - N_{PRB,ePDCCH}^{offset}) + n_{eCCE} + N_{ePUCCH}^{(1)}$ for frequency-division duplexing (FDD), where E is a total number of eCCE in one physical resource block (PRB), $I_{PRB\_ePDCCH}^{lowest\_index}$ is the lowest PRB index including at least one eCCE of ePDCCH resources, $N_{PRB,ePDCCH}^{offset}$ is a starting PRB index for an ePDCCH region, $n_{eCCE}$ is a first eCCE index number in a lowest PRB used for transmission of the corresponding ePDCCH in a downlink subframe where $0 \le n_{eCCE} < E$, and $N_{ePUCCH}^{(1)}$ is a starting PUCCH channel index for a ePUCCH region in an uplink subframe and is configured by high layers for each user equipment (UE), or $$n_{PUCCH}^{(1)} = E \cdot \left( \sum_{i=0}^{m-1} N_{PRB,ePDCCH}^{i} + (I_{PRB\_ePDCCH}^{lowest\_index} - N_{PRB,ePDCCH}^{offset}) \right) + n_{eCCE} + N_{ePUCCH}^{(1)}$$

for time-division duplexing (TDD), where E is a total number of eCCE in one physical resource block (PRB), $N_{PRB,ePDCCH}^{offset}$ is a starting PRB index for an ePDCCH region, $N_{ePUCCH}^{(1)}$ is a starting PUCCH channel index for a ePUCCH region in an uplink subframe and is configured by high layers for each user equipment (UE), $I_{PRB\_ePDCCH}^{lowest\_index}$ is the lowest PRB index including at least one eCCE of ePDCCH resources in a downlink subframe n–$k_m$, $n_{eccE}$ is a first eCCE index number used for transmission of the corresponding ePDCCH in the downlink subframe n–$k_m$ where n is an uplink subframe associated with the downlink subframe n–$k_m$, $k_m$ is a smallest value in a downlink associate set K={$k_0, k_1, \ldots k_{M-1}$} with a ePDCCH in downlink subframe n–$k_m$ where M is the number of elements in the set K and $0 \le m \le M-1$, and $N_{PRB,ePDCCH}^{i}$ is a number of ePDCCH PRBs used for transmission of ePDCCH in downlink subframe n–$k_i$.

11. The node device of claim 10, wherein a transceiver module is further operable to configure $N_{PRB,ePDCCH}^{i} > 0$ semi-statically by radio resource control (RRC) signaling or configure $N_{PRB,ePDCCH}^{i} > 0$ dynamically via a physical control format indicator channel (PCFICH) as a cell-specific parameter or a UE-specific parameter.

12. The node device of claim 10, wherein the PUCCH resource $n_{PUCCH}^{(1)}$ is a resource index for PUCCH formats 1, 1a, or 1b, and the ePDCCH uses a localized ePDCCH transmission of the eCCE or a distributed ePDCCH transmission of the eCCE.

13. The node device of claim 10, wherein the node is selected from the group consisting of a base station (BS), a Node B (NB), an evolved Node B (eNB), a baseband unit (BBU), a remote radio head (RRH), a remote radio equipment (RRE), a remote radio unit (RRU), and combinations thereof.

14. At least one non-transitory machine readable storage medium comprising a plurality of instructions adapted to be executed to implement a method for generating hybrid automatic repeat request-acknowledgement (HARQ-ACK) feedback in physical uplink control channel (PUCCH) corresponding to an enhanced physical downlink control channel (ePDCCH) at a wireless device, comprising:
receiving from a node at the wireless device a parameter for a map of a PUCCH resource $n_{PUCCH}^{(1)}$ corresponding to an ePDCCH for PUCCH resource HARQ-ACK PUCCH feedback, wherein the PUCCH resource $n_{PUCCH}^{(1)}$ is determined using a total number PUCCH of enhanced control channel element (eCCE) in one physical resource block (PRB); and
transmitting from the wireless device to the node HARQ-ACK feedback of the ePDCCH via a PUCCH based on the map,
wherein the PUCCH resource $n_{PUCCH}^{(1)}$ is represented by: $n_{PUCCH}^{(1)} = E \cdot (I_{PRB\_ePDCCH}^{lowest\_index} - N_{PRB,ePDCCH}^{offset}) + n_{eCCE} + N_{ePUCCH}^{(1)}$ for frequency-division duplexing (FDD), where E is the total number of eCCE in one PRB, $I_{PRB\_ePDCCH}^{lowest\_index}$ is the lowest PRB index including at least one eCCE of ePDCCH resources, $N_{PRB,ePDCCH}^{offset}$ is a starting PUCCH channel index for an ePDCCH region in an uplink subframe, $n_{eCCE}$ is a first eCCE index number in a lowest PRB used for transmission of the corresponding ePDCCH in a downlink subframe where $0 \le n_{eCCE} < E$, and $N_{ePUCCH}^{(1)}$ is a starting PRB index for a ePUCCH region and is configured by high layers for each user equipment (UE); or $$n_{PUCCH}^{(1)} = E \cdot \left( \sum_{i=0}^{m-1} N_{PRB,ePDCCH}^{i} + (I_{PRB\_ePDCCH}^{lowest\_index} - N_{PRB,ePDCCH}^{offset}) \right) + n_{eCCE} + N_{ePUCCH}^{(1)}$$

for time-division duplexing (TDD), where E is the total number of eCCE in one PRB, $N_{PRB,ePDCCH}^{offset}$ is a starting PRB index for an ePDCCH region, $N_{ePUCCH}^{(1)}$ is a starting PUCCH channel index for a ePUCCH region in an uplink subframe and is configured by high layers for each user equipment (UE) $I_{PRB\_ePDCCH}^{lowest\_index}$ is a lowest PRB index including at least one eCCE of ePDCCH resources in a downlink subframe n–$k_m$, $n_{eCCE}$ is a first eCCE index number used for transmission of the corresponding ePDCCH in the downlink subframe n–$k_m$ where n is an uplink subframe associated with the downlink subframe n–$k_m$, $k_m$ is a smallest value in a downlink associate set K={$k_0,k_1,\ldots k_{M-1}$} with a ePDCCH in downlink subframe n–$k_m$ where M is the number of elements in the set K and 0≤m≤M–1, and $N_{PRB,ePDCCH}^i$ is a number of ePDCCH PRBs used for transmission of ePDCCH in downlink subframe n–$k_i$.

15. The least one non-transitory machine readable storage medium of claim 14, further comprising:
   receiving from the node at the wireless device the ePDCCH; and
   determining whether the ePDCCH was properly received, wherein the HARQ-ACK feedback of the ePDCCH is based on the reception of the ePDCCH.

16. The least one non-transitory machine readable storage medium of claim 14, wherein the PUCCH resource $n_{PUCCH}^{(1)}$ is a resource index for PUCCH formats 1, 1a, or 1b, and the ePDCCH uses a localized ePDCCH transmission of the eCCE or a distributed ePDCCH transmission of the eCCE.

17. A wireless device configured to generate hybrid automatic repeat request-acknowledgement (HARQ-ACK) feedback in physical uplink control channel (PUCCH) corresponding to an enhanced physical downlink control channel (ePDCCH), comprising:
   a transceiver module configured to:
      receive from a node a parameter for a map of a PUCCH resource $n_{PUCCH}^{(1)}$ corresponding to an ePDCCH for PUCCH resource HARQ-ACK feedback, wherein the PUCCH resource $n_{PUCCH}^{(1)}$ is determined using a starting PUCCH channel index for an ePDCCH region; and
      a processing module configured to map the PUCCH resource
      transmit to the node HARQ-ACK feedback of the ePDCCH via a PUCCH based on the map; and
      a processing module configured to map the PUCCH resource $n_{PUCCH}^{(1)}$ based on the parameter,
   wherein the PUCCH resource $n_{PUCCH}^{(1)}$ is represented by:
   $n_{PUCCH}^{(1)} = E \cdot (I_{PRB\_ePDCCH}^{lowest\_index} - N_{PRB,ePDCCH}^{offset}) + n_{eCCE} + N_{ePUCCH}^{(1)}$ for frequency-division duplexing (FDD), where E is a total number of enhanced control channel element (eCCE) in one physical resource block (PRB), $I_{PRB\_ePDCCH}^{lowest\_index}$ is a lowest PRB index including at least one eCCE of ePDCCH resources, $N_{PRB,ePDCCH}^{offset}$ is starting PRB index for the ePDCCH region, $n_{eCCE}$ is a first eCCE index number in a lowest PRB used for transmission of the corresponding ePDCCH in a downlink subframe where $0 \le n_{eCCE<E}, and N_{ePUCCH}^{(1)}$ is a starting PUCCH channel index for a ePUCCH region in an uplink subframe and is configured by high layers for each user equipment (UE); or $$n_{PUCCH}^{(1)} = E \cdot \left( \sum_{i=0}^{m-1} N_{PRB,ePDCCH}^i + (I_{PRB\_ePDCCH}^{lowest\_index} - N_{PRB,ePDCCH}^{offset}) \right) + n_{eCCE} + N_{ePUCCH}^{(1)}$$

for time-division duplexing (TDD), where E is a total number of enhanced control channel element (eCCE) in one physical resource block (PRB), $N_{PRB,ePDCCH}^{offset}$ is the starting PRB index for the ePDCCH region, $N_{ePUCCH}^{(1)}$ is a starting PUCCH channel index for a ePUCCH region in an uplink subframe and is configured by high layers for each user equipment (UE), $I_{PRB\_ePDCCH}^{lowest\_index}$ is a lowest PRB index including at least one eCCE of ePDCCH resources in a downlink subframe n–$k_m$, $n_{eCCE}$ is a first eCCE index number used for transmission of the corresponding ePDCCH in the downlink subframe n–$k_m$ where n is an uplink subframe associated with the downlink subframe n–$k_m$, $k_m$ is a smallest value in a downlink associate set K ={$k_0,k_1,\ldots k_{M-1}$} with a ePDCCH in downlink subframe n–$k_m$ where M is the number of elements in the set K and 0≤m≤M–1, and $N_{PRB,eppccH}^i$ is a number of ePDCCH PRBs used for transmission of ePDCCH in downlink subframe n–$k_i$.

18. The wireless device of claim 17, wherein the transceiver module is further configured to receive from the node the ePDCCH, and the wireless device further comprises:
   the processing module configured to determine whether the ePDCCH was properly received, wherein the HARQ-ACK feedback of the ePDCCH is based on the reception of the ePDCCH.

19. The wireless device of claim 17, wherein the PUCCH resource $n_{PUCCH}^{(1)}$ is a resource index for PUCCH formats 1, 1a, or 1b, and the ePDCCH uses a localized ePDCCH transmission of the enhanced control channel element (eCCE) or a distributed ePDCCH transmission of the eCCE.

20. The wireless device of claim 17, wherein the wireless device is selected from the group consisting of a user equipment (UE) and a mobile station (MS), and the wireless device includes at least one of an antenna, a touch sensitive display screen, a speaker, a microphone, a graphics processor, an application processor, internal memory, a non-volatile memory port, and combinations thereof.

\* \* \* \* \*